(12) United States Patent
Kato et al.

(10) Patent No.: US 7,525,891 B2
(45) Date of Patent: Apr. 28, 2009

(54) METHOD FOR RECORDING DATA IN OPTICAL RECORDING MEDIUM, AN APPARATUS FOR RECORDING DATA IN OPTICAL RECORDING MEDIUM AND OPTICAL RECORDING MEDIUM

(75) Inventors: Tatsuya Kato, Tokyo (JP); Hideki Hirata, Tokyo (JP)

(73) Assignee: TDk Corporation, Tokyo (JP)

( * ) Notice: Subject to any disclaimer, the term of this patent is extended or adjusted under 35 U.S.C. 154(b) by 397 days.

(21) Appl. No.: 10/516,424

(22) PCT Filed: Jun. 2, 2003

(86) PCT No.: PCT/JP03/06922

§ 371 (c)(1),
(2), (4) Date: Nov. 29, 2004

(87) PCT Pub. No.: WO03/102931

PCT Pub. Date: Dec. 11, 2003

(65) Prior Publication Data

US 2005/0219984 A1     Oct. 6, 2005

(30) Foreign Application Priority Data

May 31, 2002     (JP)     ............................. 2002-159998

(51) Int. Cl.
*G11B 5/09*     (2006.01)

(52) U.S. Cl. .................................. 369/59.11; 369/59.12

(58) Field of Classification Search ............... 369/59.11, 369/59.12
See application file for complete search history.

(56) References Cited

U.S. PATENT DOCUMENTS 5,130,971 A * 7/1992 Ohno et al. ............... 369/59.11

(Continued)

FOREIGN PATENT DOCUMENTS

JP     62204442     9/1987

(Continued)

*Primary Examiner*—Wayne R Young
*Assistant Examiner*—Linh T Nguyen
(74) *Attorney, Agent, or Firm*—Seed IP Law Group PLLC

(57) ABSTRACT

It is an object of the present invention to provide a method for recording data in an optical recording medium which can record data in a write-once type optical recording medium at a high linear recording velocity using a laser beam having a low recording power. The method for recording data in an optical recording medium according to the present invention is constituted so that when data are to be recorded in an optical recording medium including a substrate, a first recording layer and a second recording layer by projecting a laser beam whose power is modulated in accordance with a pulse train pattern including pulses whose levels are set to levels corresponding to a recording power Pw and a bottom power Pb onto the optical recording medium and forming a recording mark at a predetermined region of the first recording layer and the second recording layer, as a linear recording velocity increases, the power of the laser beam is modulated using a pulse train pattern including a smaller number of pulses whose level is set to a level to the recording power Pw, thereby forming a recording mark. According to the present invention, since the power of a laser beam is modulated using a pulse train pattern including a smaller number of pulses whose level is set to a level to the recording power Pw as a linear recording velocity increases, it is possible to record data in an optical recording medium using a laser beam having a low recording power even when a linear recording velocity is high and on the other hand, it is possible to prevent cross-talk of data from increasing even when a linear recording velocity is low. Therefore, it is possible to employ a semiconductor laser having a relatively low output even when data are recorded at a high linear recording velocity.

16 Claims, 8 Drawing Sheets

NUMBER OF PULSES

| LINEAR RECORDING VELOCITY | | 2T | 3T | 4T | 5T | 6T | 7T | 8T |
|---|---|---|---|---|---|---|---|---|
| ↓ | LOW (VL) | 1 | 2 | 3 | 4 | 5 | 6 | 7 |
| | | 1 | 1 | 2 | 2-3 | 2-4 | 2-5 | 2-6 |
| | | 1 | 1 | 1 | 2 | 2-3 | 2-4 | 2-5 |
| | MEDIUM (VM) | 1 | 1 | 1 | 1 | 2 | 2-3 | 2-4 |
| | | 1 | 1 | 1 | 1 | 1 | 2 | 2-3 |
| | | 1 | 1 | 1 | 1 | 1 | 1 | 2 |
| | HIGH (VH) | 1 | 1 | 1 | 1 | 1 | 1 | 1 |

U.S. PATENT DOCUMENTS

| | | | |
|---|---|---|---|
| 5,412,626 A * | 5/1995 | Ohno et al. | 369/13.24 |
| 5,790,482 A * | 8/1998 | Saga et al. | 369/13.27 |
| 5,818,808 A * | 10/1998 | Takada et al. | 369/116 |
| 5,991,252 A * | 11/1999 | Kimura et al. | 369/59.12 |
| 6,236,635 B1 * | 5/2001 | Miyamoto et al. | 369/116 |
| 6,404,713 B1 * | 6/2002 | Ueki | 369/47.53 |
| 6,426,929 B1 * | 7/2002 | Watabe et al. | 369/59.12 |
| 6,441,579 B1 * | 8/2002 | Van Lydegraf et al. | 318/696 |
| 6,442,119 B1 * | 8/2002 | Sunagawa | 369/47.53 |
| 6,628,595 B1 * | 9/2003 | Sasa et al. | 369/59.12 |
| 6,631,109 B2 * | 10/2003 | Nakamura | 369/59.11 |
| 7,242,657 B2 * | 7/2007 | Ito et al. | 369/59.11 |
| 7,426,166 B2 * | 9/2008 | Yokoi | 369/59.11 |
| 2004/0174796 A1 * | 9/2004 | Mizushima et al. | 369/94 |
| 2004/0213122 A1 * | 10/2004 | Yamada et al. | 369/59.11 |
| 2005/0169149 A1 * | 8/2005 | Ito et al. | 369/59.11 |

FOREIGN PATENT DOCUMENTS

| | | | |
|---|---|---|---|
| JP | 07182856 | | 7/1995 |
| JP | 10106008 | | 4/1998 |
| JP | 10106008 A | * | 4/1998 |
| JP | 2000187842 | | 7/2000 |
| JP | 2001101709 | * | 4/2001 |

* cited by examiner (a)

NUMBER OF PULSES

| | 2T | 3T | 4T | 5T | 6T | 7T | 8T |
|---|---|---|---|---|---|---|---|
| LOW (VL) | 1 | 2 | 3 | 4 | 5 | 6 | 7 |
| | 1 | 1 | 2 | 2-3 | 2-4 | 2-5 | 2-6 |
| | 1 | 1 | 1 | 2 | 2-3 | 2-4 | 2-5 |
| MEDIUM (VM) | 1 | 1 | 1 | 1 | 2 | 2-3 | 2-4 |
| | 1 | 1 | 1 | 1 | 1 | 2 | 2-3 |
| | 1 | 1 | 1 | 1 | 1 | 1 | 2 |
| HIGH (VH) | 1 | 1 | 1 | 1 | 1 | 1 | 1 |

LINEAR RECORDING VELOCITY (a)

(b)

(a)

(b)

US 7,525,891 B2

METHOD FOR RECORDING DATA IN OPTICAL RECORDING MEDIUM, AN APPARATUS FOR RECORDING DATA IN OPTICAL RECORDING MEDIUM AND OPTICAL RECORDING MEDIUM

BACKGROUND OF THE INVENTION

1. Field of the Invention

The present invention relates to a method for recording data in an optical recording medium, an apparatus for recording data in an optical recording medium and an optical recording medium, and particularly, to a method for recording data in an optical recording medium and an apparatus for recording data in an optical recording medium which can record data in a write-once type optical recording medium using a laser beam having a low recording power at a high linear recording velocity and a write-once type optical recording medium in which data can be recorded using a laser beam having a low recording power at a high linear recording velocity.

2. Description of the Related Art

Optical recording media such as the CD, DVD and the like have been widely used as recording media for recording digital data. These optical recording media can be roughly classified into optical recording media such as the CD-ROM and the DVD-ROM that do not enable writing and rewriting of data (ROM type optical recording media), optical recording media such as the CD-R and DVD-R that enable writing but not rewriting of data (write-once type optical recording media), and optical recording media such as the CD-RW and DVD-RW that enable rewriting of data (data rewritable type optical recording media).

As well known in the art, data are generally recorded in a ROM type optical recording medium using pre-pits formed in a substrate in the manufacturing process thereof, while in a data rewritable type optical recording medium a phase change material is generally used as the material of the recording layer and data are recorded utilizing changes in an optical characteristic caused by phase change of the phase change material.

On the other hand, in a write-once type optical recording medium, an organic dye such as a cyanine dye, phthalocyanine dye or azo dye is generally used as the material of the recording layer and data are recorded utilizing changes in an optical characteristic caused by chemical change of the organic dye, or chemical change and physical change of the organic dye.

Further, there is known a write-once type recording medium formed by laminating two recording layers (See Japanese Patent Application Laid Open No. 62-204442, for example) and in this optical recording medium, data are recorded therein by projecting a laser beam thereon and mixing elements contained in the two recording layers to form a region whose optical characteristic differs from those of regions therearound.

In this specification, in the case where an optical recording medium includes a recording layer containing an organic dye, a region in which an organic dye chemically changes or chemically and physically changes upon being irradiated with a laser beam is referred to as "a recording mark" and in the case where an optical recording medium includes two recording layers each containing an inorganic element as a primary component, a region in which the inorganic elements contained in the two recording layers as a primary component are mixed upon being irradiated with a laser beam is referred to as "a recording mark".

An optimum method for modulating the power of a laser beam projected onto an optical recording medium for recording data therein is generally called "a pulse train pattern" or "recording strategy".

FIG. 8 is a diagram showing a typical pulse train pattern used for recording data in a CD-R including a recording layer containing an organic dye and shows a pulse train pattern for recording 3T to 11T signals in the EFM Modulation Code.

As shown in FIG. 8, in the case where data are to be recorded in a CD-R, a recording pulse having a width corresponding to the length of a recording mark M to be formed is generally employed (See Japanese Patent Application Laid Open No. 2000-187842, for example).

More specifically, the power of a laser beam is fixed to a bottom power Pb when the laser beam is projected onto a blank region in which no recording mark M is formed and fixed to a recording power Pw when the laser beam is projected onto a region in which a recording mark M is to be formed. As a result, an organic dye contained in a recording layer is decomposed or degraded at a region in which a recording mark M is to be formed and the region is physically deformed, thereby forming a recording mark M therein. In this specification, such a pulse train pattern is called a single pulse pattern.

FIG. 9 is a diagram showing a typical pulse train pattern used for recording data in a DVD-R including a recording layer containing an organic dye and shows a pulse train pattern for recording a T signal in the 8/16 Modulation Code.

Since data are recorded in a DVD-R at a higher linear recording velocity than when recording data in a CD-R, unlike the case of recording data in a CD-R, it is difficult to form a recording mark having a good shape using a recording pulse having a width corresponding to the length of the recording mark M to be formed.

Therefore, data are recorded in a DVD-R using a pulse train in which, as shown in FIG. 9, the recording pulse is divided into a number of divided pulses corresponding to the length of the recording mark M to be formed.

More specifically, in the case of recording an nT signal where n is an integer equal to or larger than 3 and equal to or smaller than 11 or 14 in the 8/16 Modulation Code, (n−2) divided pulses are employed and the power of the laser beam is set to a recording power Pw at the peak of each of the divided pulses and set to a bottom power Pb at the other portions of the pulse. In this specification, the thus constituted pulse train pattern is referred to as "a basic pulse train pattern".

As shown in FIG. 9, in the basic pulse train pattern, the level of a bottom power Pb is set to be equal to a reproducing power Pr used for reproducing data or close thereto.

On the other hand, a next-generation type optical recording medium that offers improved recording density and has an extremely high data transfer rate has been recently proposed.

In such a next-generation type optical recording medium, in order to achieve an extremely high data transfer rate, it is required to record data at a higher linear recording velocity than that in a conventional optical recording medium, and since the recording power Pw necessary for forming a recording mark is generally substantially proportional to the square root of the linear recording velocity in a write-once optical recording medium, it is necessary to employ a semiconductor laser having a high output for recording data in a next-generation optical recording medium.

Further, in the next-generation type optical recording medium, the achievement of increased recording capacity and extremely high data transfer rate inevitably requires the diameter of the laser beam spot used to record and reproduce data to be reduced to a very small size.

In order to reduce the laser beam spot diameter, the numerical aperture of the objective lens for condensing the laser beam needs to be increased to 0.7 or more, for example, to about 0.85, and the wavelength of the laser beam needs to be shortened to 450 nm or less, for example, to about 400 nm.

However, the output of a semiconductor laser emitting a laser beam having a wavelength equal to or shorter than 450 nm is smaller than that of a semiconductor laser emitting a laser beam having a wavelength of 780 nm for a CD and that of a semiconductor laser emitting a laser beam having a wavelength of 650 nm for a DVD, and a semiconductor laser that emits a laser beam having a wavelength equal to or shorter than 450 nm and has a high output is expensive.

These problems are particularly serious in a write-once type optical recording medium so constituted that elements contained in a plurality of recording layers mix with each other by heat generated by a laser beam projected thereonto, thereby forming a recording mark.

BRIEF SUMMARY OF THE INVENTION

It is therefore an object of the present invention to provide a method for recording data in an optical recording medium which can record data in a write-once type optical recording medium at a high linear recording velocity using a laser beam having a low recording power.

It is another object of the present invention to provide a method for recording data in an optical recording medium which can record data in a write-once type optical recording medium at a high linear recording velocity using an inexpensive semiconductor laser having a low output.

It is a further object of the present invention to provide a method for recording data in an optical recording medium which can record data in a write-once type optical recording medium including two or more recording layers at a high linear recording velocity using a laser beam having a low recording power.

It is a further object of the present invention to provide an apparatus for recording data in an optical recording medium which can record data in a write-once type optical recording medium at a high linear recording velocity using a laser beam having a low recording power.

It is a further object of the present invention to provide an apparatus for recording data in an optical recording medium which can record data in a write-once type optical recording medium at a high linear recording velocity using an inexpensive semiconductor laser having a low output.

It is a further object of the present invention to provide an apparatus for recording data in an optical recording medium which can record data in a write-once type optical recording medium including two or more recording layers at a high linear recording velocity using a laser beam having a low recording power.

It is a further object of the present invention to provide an optical recording medium in which data can be recorded at a high linear recording velocity using a laser beam having a low recording power.

It is a further object of the present invention to provide an optical recording medium in which data can be recorded at a high linear recording velocity using an inexpensive semiconductor laser having a low output.

It is a further object of the present invention to provide an optical recording medium including two or more recording layers in which data can be recorded at a high linear recording velocity using a laser beam having a low recording power.

The inventors of the present invention vigorously pursued a study for accomplishing the above objects and, as a result, made the discovery that in order to record data in an optical recording medium at a high linear recording velocity using a laser beam having a low recording power it was effective to increase a total amount of heat supplied for forming a recording mark by modulating the power of the laser beam using the single pulse pattern, but that in the case where the linear recording velocity of data was low, if the total amount of heat supplied for forming a recording mark was increased by modulating the power of the laser beam using the single pulse pattern, the recording mark became wider and cross-talk of data increased and that in the case of employing a pulse train pattern having a smaller number of pulses whose level was set to a level corresponding to a recording power as the linear recording velocity became higher and modulating the power of a laser beam thereby to record data in a write-once type optical recording medium, it was possible to record data in the write-once type optical recording medium at a high linear recording velocity using a laser beam having a low recording power and it was possible to prevent cross-talk of data from increasing even when a linear recording velocity was low.

Therefore, the above objects of the present invention can be accomplished by a method for recording data in an optical recording medium wherein data are recorded in a write-once type optical recording medium including at least one recording layer disposed on a substrate by projecting a laser beam whose power is modulated in accordance with a pulse train pattern including at least pulses whose levels are set to levels corresponding to a recording power and a bottom power onto the at least one recording layer and forming a recording mark in a predetermined region of the at least one recording layer, the method for recording data in an optical recording medium comprising a step of employing a pulse train pattern having the smaller number of pulses whose level is set to a level corresponding to a recording power as a linear recording velocity becomes higher and modulating the power of a laser beam thereby to form a recording mark in the predetermined region of the at least one recording layer.

In this specification, in the case where an optical recording medium includes a recording layer containing an organic dye, a region in which the organic dye chemically changes or chemically and physically changes upon being irradiated with a laser beam is referred to as a "recording mark" and in the case where an optical recording medium includes two recording layers each containing an inorganic element as a primary component, a region in which the inorganic elements contained in the two recording layers as a primary component are mixed upon being irradiated with a laser beam is referred to as a "recording mark".

According to the present invention, since data are recorded in a predetermined region of the at least one recording layer by employing a pulse train pattern having the smaller number of pulses whose level is set to a level corresponding to a recording power as the linear recording velocity becomes higher and modulating the power of a laser beam thereby to form a recording mark in the predetermined region of the at least one recording layer, it is possible to record data in an optical recording medium using a laser beam having a low recording power even when the linear recording velocity is high and it is possible to prevent cross-talk of data from increasing even when the linear recording velocity is low. Therefore, it is possible to employ a semiconductor laser having a relatively low output even when data are recorded at a high linear recording velocity.

Further, according to the present invention, data can be recorded using a laser beam having substantially the same recording power even at different linear recording velocities.

In a preferred aspect of the present invention, the number of pulses is set to 1 in the case where data are to be recorded at a linear recording velocity equal to or higher than a first linear recording velocity VH.

In a preferred aspect of the present invention, in the case where data are to be recorded at a linear recording velocity VM lower than the first linear recording velocity VH and higher than a second linear recording velocity VL, the number of pulses is set to 1 at least when the shortest recording mark is to be formed and the number of pulses is set larger as a length of the recording mark to be formed becomes longer.

In a preferred aspect of the present invention, in the case where data are to be recorded at a linear recording velocity lower than the first linear recording velocity VH and higher than a second linear recording velocity VL, the number of pulses is set to 1 at least when the shortest recording mark is to be formed and the number of pulses is set larger as the linear recording velocity VM becomes lower.

In a preferred aspect of the present invention, in the case where data are to be recorded by forming recording marks having respective lengths at a linear recording velocity, the number of pulses is set so that a difference between itself and the number representing a length of a recording mark is constant.

In a further preferred aspect of the present invention, the first linear recording velocity is determined to be equal to or higher than 10 m/sec.

In a further preferred aspect of the present invention, the bottom power is set to a higher level as the linear recording velocity becomes higher.

In a further preferred aspect of the present invention, a ratio of the bottom power to the recording power is set higher as the linear recording velocity becomes higher.

In a further preferred aspect of the present invention, data are recorded in the optical recording medium by projecting a laser beam having a wavelength equal to or shorter than 450 nm thereonto.

In a further preferred aspect of the present invention, data are recorded in the optical recording medium by employing an objective lens and a laser beam whose numerical aperture NA and wavelength λ satisfy $\lambda/NA \leq 640$ nm, and projecting the laser beam onto the optical recording medium via the objective lens.

In a preferred aspect of the present invention, the optical recording medium further comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

In a further preferred aspect of the present invention, the second recording layer is formed so as to be in contact with the first recording layer.

The above objects of the present invention can be also accomplished by a method for recording data in an optical recording medium wherein data are recorded in a write-once type optical recording medium including at least one recording layer disposed on a substrate by projecting a laser beam whose power is modulated in accordance with a pulse train pattern including at least pulses whose levels are set to levels corresponding to a recording power and a bottom power onto the at least one recording layer and forming a recording mark in a predetermined region of the at least one recording layer, the method for recording data in an optical recording medium comprising a step of employing a pulse train pattern having a smaller number of pulses whose level is set to a level corresponding to a recording power as a ratio of a track pitch TP of the optical recording medium to a diameter of a spot of the laser beam becomes smaller and modulating the power of a laser beam thereby to form a recording mark in the predetermined region of the at least one recording layer.

The above objects of the present invention can be also accomplished by an apparatus for recording data in an optical recording medium wherein data are recorded in a write-once type optical recording medium including at least one recording layer disposed on a substrate by projecting a laser beam whose power is modulated in accordance with a pulse train pattern including at least pulses whose levels are set to levels corresponding to a recording power and a bottom power onto the at least one recording layer and forming a recording mark in a predetermined region of the at least one recording layer, the apparatus for recording data in an optical recording medium being constituted so as to employ a pulse train pattern having a smaller number of pulses whose level is set to a level corresponding to a recording power as a linear recording velocity becomes higher and modulate the power of a laser beam thereby to form a recording mark in the predetermined region of the at least one recording layer.

According to the present invention, the apparatus for recording data in an optical recording medium is constituted so as to employ a pulse train pattern having a smaller number of pulses whose level is set to a level corresponding to a recording power as the linear recording velocity becomes higher and modulate the power of a laser beam thereby to form a recording mark in the predetermined region of the at least one recording layer, so that it is possible to record data in an optical recording medium using a laser beam having a low recording power even when the linear recording velocity is high and it is possible to prevent cross-talk of data from increasing even when the linear recording velocity is low. Therefore, it is possible to employ a semiconductor laser having a relatively low output even when data are recorded at a high linear recording velocity.

In a preferred aspect of the present invention, the number of pulses is set to 1 in the case where data are to be recorded at a linear recording velocity equal to or higher than a first linear recording velocity VH.

In a preferred aspect of the present invention, in the case where data are to be recorded at a linear recording velocity VM lower than the first linear recording velocity VH and higher than a second linear recording velocity VL, the number of pulses is set to 1 at least when the shortest recording mark is to be formed and the number of pulses is set larger as the length of a recording mark to be formed becomes longer.

In a preferred aspect of the present invention, in the case where data are to be recorded at a linear recording velocity lower than the first linear recording velocity VH and higher than a second linear recording velocity VL, the number of pulses is set to 1 at least when the shortest recording mark is to be formed and the number of pulses is set larger as the linear recording velocity VM becomes lower.

In a preferred aspect of the present invention, in the case where data are to be recorded by forming recording marks having respective lengths at a linear recording velocity, the number of pulses is set so that a difference between itself and the number representing a length of a recording mark is constant.

In a further preferred aspect of the present invention, the first linear recording velocity is determined to be equal to or higher than 10 m/sec.

The above and other objects of the present invention can be also accomplished by a write-once type optical recording medium comprising a substrate and at least one recording layer disposed on the substrate and being constituted so that data are recorded by projecting a laser beam whose power is modulated in accordance with a pulse train pattern including at least pulses whose levels are set to levels corresponding to a recording power and a bottom power onto the at least one recording layer and forming a recording mark in the at least one recording layer, the optical recording medium being recorded with data for setting recording conditions necessary for employing a pulse train pattern having a smaller number of pulses whose level is set to a level corresponding to a recording power as a linear recording velocity becomes higher and modulating the power of a laser beam thereby.

According to the present invention, since it is possible to record data in an optical recording medium by reading data for setting recording conditions recorded in the optical recording medium when data are to be recorded in the optical recording medium, employing a pulse train pattern having a smaller number of pulses whose level is set to a level corresponding to a recording power as the linear recording velocity becomes higher and modulating the power of a laser beam thereby to form, it is possible to record data in an optical recording medium using a laser beam having a low recording power even when the linear recording velocity is high and it is possible to prevent cross-talk of data from increasing even when the linear recording velocity is low. Therefore, it is possible to employ a semiconductor laser having a relatively low output even when data are recorded at a high linear recording velocity.

In a preferred aspect of the present invention, the optical recording medium further comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

In a further preferred aspect of the present invention, the second recording layer is formed so as to be in contact with the first recording layer.

In the present invention, it is preferable for the first recording layer and the second recording layer to contain different elements as a primary component and for each of them to contain an element selected from a group consisting of Al, Si, Ge, C, Sn, Au, Zn, Cu, B, Mg, Ti, Mn, Fe, Ga, Zr, Ag and Pt as a primary component.

In a preferred aspect of the present invention, the first recording layer contains an element selected from a group consisting of Si, Ge, Sn, Mg, In, Zn, Bi and Al as a primary component, and the second recording layer contains Cu as a primary component.

In the present invention, in the case where the first recording layer contains an element selected from a group consisting of Si, Ge, Sn, Mg, In, Zn, Bi and Al as a primary component, and the second recording layer contains Cu as a primary component, the optical recording medium may include one or more recording layers containing an element selected from the group consisting of Si, Ge, Sn, Mg, In, Zn, Bi and Al as a primary component or one or more recording layers containing Cu as a primary element, in addition to the first recording layer and the second recording layer.

In the present invention, it is more preferable for the first recording layer to contain an element selected from a group consisting of Ge, Si, Mg, Al and Sn as a primary component.

In the present invention, in the case where the first recording layer contains an element selected from a group consisting of Si, Ge, Sn, Mg, In, Zn, Bi and Al as a primary component, and the second recording layer contains Cu as a primary component, it is preferable that at least one kind of an element selected from the group consisting of Al, Si, Zn, Mg, Au, Sn, Ge, Ag, P, Cr, Fe and Ti is added to the second recording layer and it is more preferable that at least one kind of an element selected from the group consisting of Al, Zn, Sn and Au is added to the second recording layer.

In another preferred aspect of the present invention, the first recording layer contains an element selected from a group consisting of Si, Ge, C, Sn, Zn and Cu as a primary component and the second recording layer contains Al as a primary component.

In the present invention in the case where the first recording layer contains an element selected from a group consisting of Si, Ge, C, Sn, Zn and Cu as a primary component and the second recording layer contains Al as a primary component, the optical recording medium may include one or more recording layer containing an element selected from the group consisting of Si, Ge, C, Sn, Zn and Cu as a primary component or one or more recording layer containing Al as a primary component, in addition to the first recording layer and the second recording layer.

In the present invention in the case where the first recording layer contains an element selected from a group consisting of Si, Ge, C, Sn, Zn and Cu as a primary component and the second recording layer contains Al as a primary component, it is preferable that at least one kind of an element selected from the group consisting of Mg, Au, Ti and Cu is added to the second recording layer.

In the present invention in the case where the first recording layer contains an element selected from a group consisting of Si, Ge, C, Sn, Zn and Cu as a primary component and the second recording layer contains Al as a primary component, the first recording layer and the second recording layer are preferably formed so that the total thickness thereof is 2 nm to 40 nm, more preferably, 2 nm to 30 nm, most preferably, 2 nm to 20 nm.

In a further preferred aspect of the present invention, the first recording layer contains an element selected from a group consisting of Si, Ge, C and Al as a primary component, the second recording layer contains Zn as a primary component and the first recording layer and the second recording layer are formed so that the total thickness thereof is equal to or thinner than 30 nm.

In the present invention, in the case where the first recording layer contains an element selected from a group consisting of Si, Ge, C and Al as a primary component and the second recording layer contains Zn as a primary component, the optical recording medium may include one or more recording layer containing an element selected from the group consisting of Si, Ge, C and Al as a primary component or one or more recording layer containing Zn as a primary component.

In the present invention, in the case where the first recording layer contains an element selected from a group consisting of Si, Ge, C and Al as a primary component and the second recording layer contains Zn as a primary component, it is preferable for the first recording layer to contain an element selected from a group consisting of Si, Ge and C as a primary component.

In the present invention, in the case where the first recording layer contains an element selected from a group consisting of Si, Ge, C and Al as a primary component and the second recording layer contains Zn as a primary component, the first recording layer and the second recording layer are preferably formed so that the total thickness thereof is 2 nm to 30 nm, more preferably, 2 nm to 24 nm, most preferably, 2 nm to 12 nm.

In the present invention, in the case where the first recording layer contains an element selected from a group consisting of Si, Ge, C and Al as a primary component and the second recording layer contains Zn as a primary component, it is preferable that at least one kind of an element selected from the group consisting of Mg, Cu and Al I added to the second recording layer.

In a preferred aspect of the present invention, the light transmission layer is formed so as to have a thickness of 10 nm to 300 nm.

The above and other objects and features of the present invention will become apparent from the following description made with reference to the accompanying drawings.

BRIEF DESCRIPTION OF THE SEVERAL VIEWS OF THE DRAWINGS

FIG. 3 is a table showing how the number of pulses of a pulse train pattern for modulating the power of a laser beam and linear recording velocity are related to the length of a recording mark to be formed using the 1,7RLL Modulation Code.

FIG. 4 is a set of diagrams showing pulse train patterns used for recording data in an optical recording medium at a first linear recording velocity VL, wherein FIG. 4(a) shows a pulse train pattern used for recording a 2T signal and FIG. 4(b) shows a pulse train pattern used for recording one of a 3T signal to an 8T signal.

FIG. 6 is a set of diagrams showing pulse train patterns used for recording data in an optical recording medium at a second linear recording velocity VM higher than a first linear recording velocity VL and lower than a third linear recording velocity VH, wherein FIG. 6(a) shows a pulse train pattern used for recording one of a 2T signal to a 5T signal and FIG. 6(b) shows a pulse train pattern used for recording one of a 6T signal to an 8T signal.

DETAILED DESCRIPTION OF THE INVENTION

Preferred embodiments of the present invention will now be described with reference to accompanying drawings.

Figure 1:
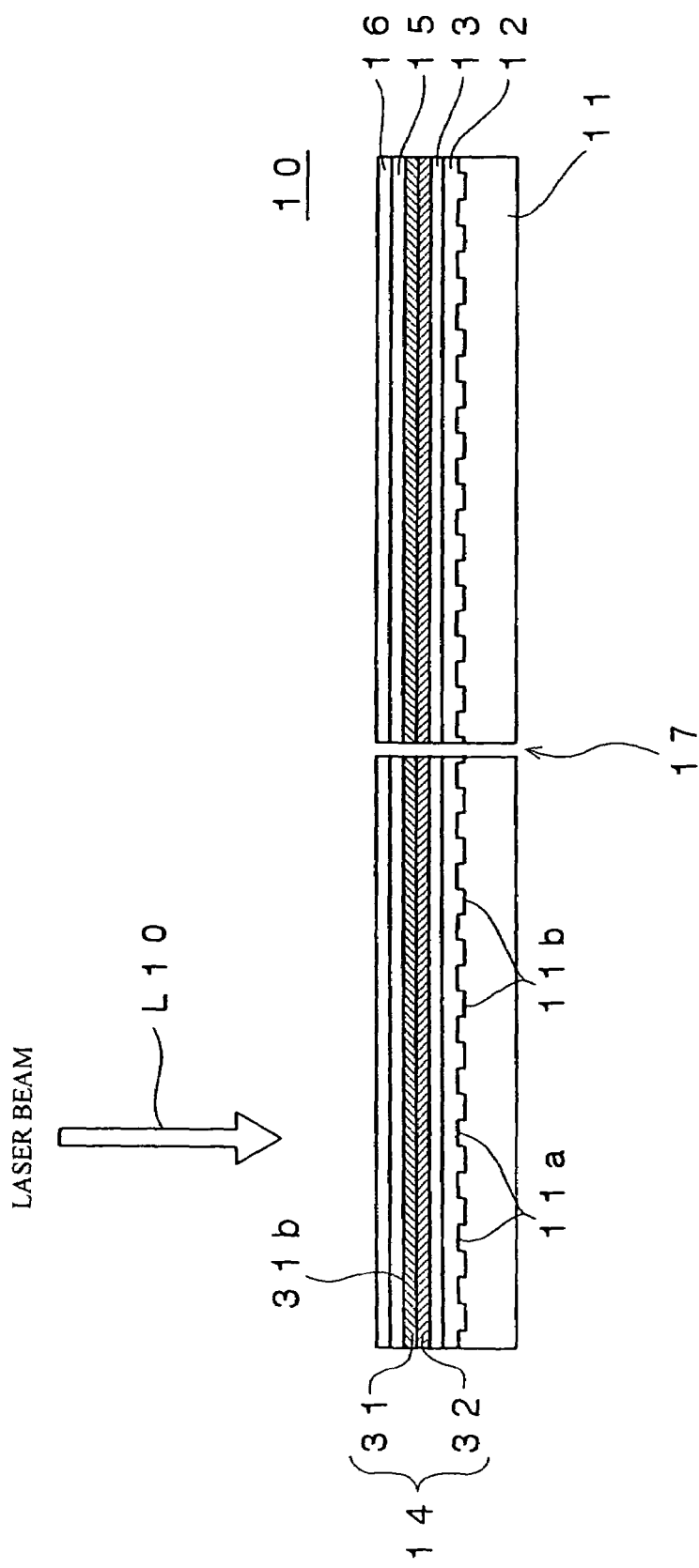
FIG. 1 is a schematic cross-sectional view showing the structure of an optical recording medium that is a preferred embodiment of the present invention.

FIG. 1 is a schematic cross-sectional view showing the structure of an optical recording medium that is a preferred embodiment of the present invention.

As shown in FIG. 1, the optical recording medium 10 according to this embodiment is constituted as a write-once type optical recording medium and includes a substrate 11, a reflective layer 12 formed on the surface of the substrate 11, a second dielectric layer 13 formed on the surface of the reflective layer 12, a second recording layer 32 formed on the surface of the second dielectric layer 13, a first recording layer 31 formed on the surface of the second recording layer 32, a first dielectric layer 15 formed on the surface of the first recording layer 31 and a light transmission layer 16 formed on the surface of the first dielectric layer 15.

As shown in FIG. 1, a center hole is formed at a center portion of the optical recording medium 10.

In this embodiment, as shown in FIG. 1, a laser beam L10 is projected onto the surface of the light transmission layer 16, thereby recording data in the optical recording medium 10 or reproducing data from the optical recording medium 10.

The substrate 11 serves as a support for ensuring mechanical strength required for the optical recording medium 10.

The material used to form the substrate 11 is not particularly limited insofar as the substrate 11 can serve as the support of the optical recording medium 10. The substrate 11 can be formed of glass, ceramic, resin or the like. Among these, resin is preferably used for forming the substrate 11 since resin can be easily shaped. Illustrative examples of resins suitable for forming the substrate 40 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the substrate 11 from the viewpoint of easy processing, optical characteristics and the like.

In this embodiment, the substrate 11 has a thickness of about 1.1 mm.

The shape of the substrate 11 is not particularly limited but is normally disk-like, card-like or sheet-like.

As shown in FIG. 1, grooves 1a and lands 11b are alternately formed on the surface of the substrate 11. The grooves 11a and/or lands 11b serve as a guide track for the laser beam L10 when data are to be recorded or when data are to be reproduced.

The reflective layer 12 serves to reflect the laser beam L10 entering through the light transmission layer 16 so as to emit it from the light transmission layer 16.

The thickness of the reflective layer 12 is not particularly limited but is preferably from 10 nm to 300 nm, more preferably from 20 nm to 200 nm.

The material used to form the reflective layer 12 is not particularly limited insofar as it can reflect a laser beam, and the reflective layer 12 can be formed of Mg, Al, Ti, Cr, Fe, Co, Ni, Cu, Zn, Ge, Ag, Pt, Au and the like. Among these materials, it is preferable to form the reflective layer 12 of a metal material having a high reflectivity, such as Al, Au, Ag, Cu or alloy containing at least one of these metals, such as alloy of Al and Ti.

The reflective layer 12 is provided in order to increase the difference in reflection coefficient between a recorded region and an unrecorded region by a multiple interference effect when the laser beam L10 is used to optically reproduce data from the first recording layer 31 and the second recording layer 32, thereby obtaining a higher reproduced signal (C/N ratio).

The first dielectric layer 15 and the second dielectric layer 13 serve to protect the first recording layer 31 and the second recording layer 32. Degradation of optically recorded data can be prevented over a long period by the first dielectric layer 15 and the second dielectric layer 13. Further, since the second dielectric layer 13 also serves to prevent the substrate 11 and the like from being deformed by heat, it is possible to effectively prevent jitter and the like from becoming worse due to the deformation of the substrate 11 and the like.

The dielectric material used to form the first dielectric layer 15 and the second dielectric layer 13 is not particularly limited insofar as it is transparent and the first dielectric layer 15 and the second dielectric layer 13 can be formed of a dielectric material containing oxide, sulfide, nitride or a combination thereof, for example, as a primary component. More specifically, in order to prevent the substrate 11 and the like from being deformed by heat and thus protect the first recording layer 31 and the second recording layer 32, it is preferable for the first dielectric layer 15 and the second dielectric layer 13 to contain at least one kind of dielectric material selected from the group consisting of $Al_2O_3$, AlN, ZnO, ZnS, GeN, GeCrN, CeO, SiO, $SiO_2$, SiN and SiC as a primary component and it is more preferable for the first dielectric layer 15 and the second dielectric layer 13 to contain $ZnS.SiO_2$ as a primary component.

The first dielectric layer 15 and the second dielectric layer 13 may be formed of the same dielectric material or of different dielectric materials. Moreover, at least one of the first dielectric layer 15 and the second dielectric layer 13 may have a multi-layered structure including a plurality of dielectric films.

In this specification, the statement that a dielectric layer contains a certain dielectric material as a primary component means that the dielectric material is maximum among dielectric materials contained in the dielectric layer. $ZnS.SiO_2$ means a mixture of ZnS and $SiO_2$.

The thickness of the first dielectric layer 15 and the second dielectric layer 13 is not particularly limited but is preferably from 3 nm to 200 nm. If the first dielectric layer 15 or the second dielectric layer 13 is thinner than 3 nm, it is difficult to obtain the above-described advantages. On the other hand, if the first dielectric layer 15 or the second dielectric layer 13 is thicker than 200 nm, it takes a long time to form the first dielectric layers 15 and the second dielectric layers 13, thereby lowering the productivity of the optical recording medium 10, and cracks may be generated in the optical recording medium 10 owing to stress present in the first dielectric layers 15 and/or the second dielectric layer 13.

The first recording layer 31 and the second recording layer 32 are adapted for recording data therein. In this embodiment, the first recording layer 31 is disposed on the side of the light transmission layer 16 and the second recording layer 32 is disposed on the side of the substrate 11.

In this embodiment, the first recording layer 31 contains an element selected from the group consisting of Si, Ge, Sn, Mg, In, Zn, Bi and Al as a primary component and the second recording layer 32 contains Cu as a primary component.

It is possible to improve the long term storage reliability of an optical recording medium 10 by proving the first recording layer 31 containing an element selected from the group consisting of Si, Ge, Sn, Mg, In, Zn, Bi and Al as a primary component and the second recording layer 32 containing Cu as a primary component in this manner.

Further, these elements apply only light load to the environment and there is no risk of the global atmosphere being damaged.

In order to thoroughly improve the C/N ratio of the reproduced signal, it is particularly preferable for the first recording layer 31 to contain an element selected from the group consisting of Ge, Si, Mg, Al and Sn as a primary component and is particularly preferable for the to contain Si as a primary component.

Cu contained in the second recording layer 32 as a primary component quickly mixes with the element contained in the first recording layer 31 when irradiated with a laser beam L10, thereby enabling data to be quickly recorded in the first recording layer 31 and the second recording layer 32.

In order to improve the recording sensitivity of the first recording layer 31, it is preferable for the first recording layer 31 to be added with at least one kind of an element selected from the group consisting of Mg, Al, Cu, Ag and Au.

In order to improve the storage reliability and the recording sensitivity of the second recording layer 32, it is preferable for the second recording layer 32 to be added with at least one kind of an element selected from the group consisting of Al, Si, Zn, Mg, Au, Sn, Ge, Ag, P, Cr, Fe and Ti.

The total thickness of the first recording layer 31 and the second recording layer 32 is not particularly limited but the surface smoothness of the first recording layer 31 irradiated with the laser beam L10 becomes worse as the total thickness of the first recording layer 31 and the second recording layer 32 becomes thicker. As a result, the noise level of the reproduced signal becomes higher and the recording sensitivity is lowered. On the other hand, in the case where the total thickness of the first recording layer 31 and the second recording layer 32 is too small, the change in reflection coefficient between before and after irradiation with the laser beam L10 is small, so that a reproduced signal having high strength (C/N ratio) cannot be obtained. Moreover, it becomes difficult to control the thickness of the first recording layer 31 and the second recording layer 32.

Therefore, in this embodiment, the first recording layer 31 and the second recording layer 32 are formed so that the total thickness thereof is from 2 nm to 40 nm. In order to obtain a reproduced signal having higher strength (C/N ratio) and further decrease the noise level of the reproduced signal, the total thickness of the first recording layer 31 and the second recording layer 32 is preferably from 2 nm to 20 nm and more preferably 2 nm to 10 nm.

The individual thicknesses of the first recording layer 31 and the second recording layer 32 are not particularly limited but in order to considerably improve the recording sensitivity and greatly increase the change in reflection coefficient between before and after irradiation with the laser beam L10, the thickness of the first recording layer 31 is preferably from 1 nm to 30 nm and the thickness of the second recording layer 32 is preferably from 1 nm to 30 nm. Further, it is preferable to define the ratio of the thickness of the first recording layer 31 to the thickness of the second recording layer 32 (thickness of first recording layer 31/thickness of second recording layer 32) to be from 0.2 to 5.0.

The light transmission layer 16 serves to transmit a laser beam L10 and preferably has a thickness of 10 μm to 300 μm. More preferably, the light transmission layer 16 has a thickness of 50 μm to 150 μm.

The material used to form the light transmission layer 16 is not particularly limited but in the case where the light transmission layer 16 is to be formed by the spin coating process or the like, ultraviolet ray curable resin, electron beam curable resin or the like is preferably used. More preferably, the light transmission layer 16 is formed of ultraviolet ray curable resin.

The light transmission layer 16 may be formed by adhering a sheet made of light transmittable resin to the surface of the first dielectric layer 15 using an adhesive agent.

The optical recording medium 10 having the above-described configuration can, for example, be fabricated in the following manner.

The reflective layer 12 is first formed on the surface of the substrate 11 formed with the grooves 11a and lands 11b.

The reflective layer 12 can be formed by a gas phase growth process using chemical species containing elements for forming the reflective layer 12. Illustrative examples of the gas phase growth processes include vacuum deposition process, sputtering process and the like.

The second dielectric layer 13 is then formed on surface of the reflective layer 12.

The second dielectric layer 13 can be also formed by a gas phase growth process using chemical species containing elements for forming the second dielectric layer 13. Illustrative examples of the gas phase growth processes include vacuum deposition process, sputtering process and the like.

The second recording layer 32 is further formed on the second dielectric layer 13. The second recording layer 32 can be also formed by a gas phase growth process using chemical species containing elements for forming the second recording layer 32.

The first recording layer 31 is then formed on the second recording layer 32. The first recording layer 31 can be also formed by a gas phase growth process using chemical species containing elements for forming the first recording layer 31.

The first dielectric layer 15 is then formed on the first recording layer 31. The first dielectric layer 15 can be also formed by a gas phase growth process using chemical species containing elements for forming the first dielectric layer 15.

Finally, the light transmission layer 16 is formed on the first dielectric layer 15. The light transmission layer 16 can be formed, for example, by applying an acrylic ultraviolet ray curable resin or epoxy ultraviolet ray curable resin adjusted to an appropriate viscosity onto the surface of the second dielectric layer 15 by spin coating to form a coating layer and irradiating the coating layer with ultraviolet rays to cure the coating layer.

Thus, the optical recording medium 10 was fabricated.

Data are recorded in the optical recording medium 10 of the above-described configuration, in the following manner, for example.

As shown in FIGS. 1 and 2(a), the first recording layer 31 and the second recording layer 32 are first irradiated via the light transmission layer 16 with a laser beam L10 having predetermined power.

In order to record data with high recording density, it is preferable to project a laser beam L10 having a wavelength λ of 450 nm or shorter onto the optical recording medium 10 via an objective lens (not shown) having a numerical aperture NA of 0.7 or more and it is more preferable that λ/NA be equal to or smaller than 640 nm. In such a case, the spot diameter of the laser beam L10 on the surface of the first recording layer 31 becomes equal to or smaller than 0.65 μm.

In this embodiment, a laser beam L10 having a wavelength λ of 405 nm is condensed onto the optical recording medium 10 via an objective lens having a numerical aperture NA of 0.85 so that the spot diameter of the laser beam L10 on the surface of the first recording layer 31 becomes about 0.43 μm.

As a result, the element contained in the first recording layer 31 as a primary component and the element contained in the second recording layer 32 as a primary component mix with each other and as shown in FIG. 2(b), a recording mark M composed of a mixture of the primary component element of the first recording layer 31 and the primary component element of the second recording layer 32 is formed.

When the primary component elements of the first recording layers 31 and 32 are mixed, the reflection coefficient of the region markedly changes. Since the reflection coefficient of the thus formed recording mark M is therefore greatly different from that of the region surrounding the mixed region M, it is possible to obtain a high reproduced signal (C/N ratio) when optically recorded information is reproduced.

When the laser beam L10 is projected, the first recording layer 31 and the second recording layer 32 are heated by the laser beam L10. In this embodiment, however, the first dielectric layer 15 and the second dielectric layer 13 are disposed outward of the first recording layer 31 and the second recording layer 32. Deformation of the substrate 11 and the light transmission layer 16 by heat is therefore effectively prevented.

In the case where data are to be recorded in an optical recording medium 10 by projecting a laser beam L10 thereonto, the power of the laser beam L10 is modulated in accordance with a pulse train pattern including pulses whose levels are set to a recording power Pw and a bottom power Pb.

Figure 2:
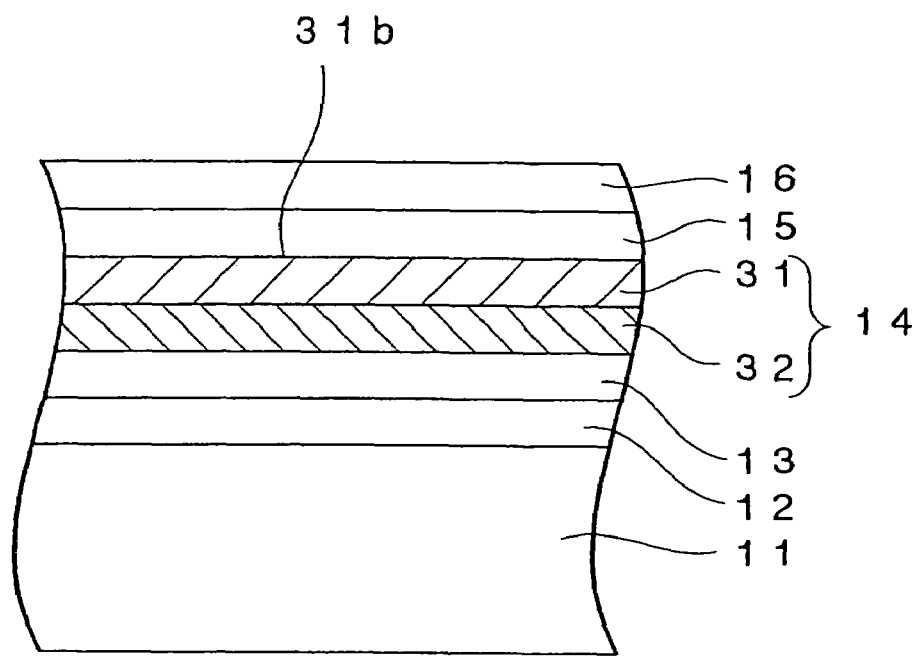
FIG. 2(a) is a schematic enlarged cross-sectional view of the optical recording medium shown in FIG. 1
FIG. 2(b) is a schematic enlarged cross-sectional view showing an optical recording medium after data have been recorded therein.
Figure 2:
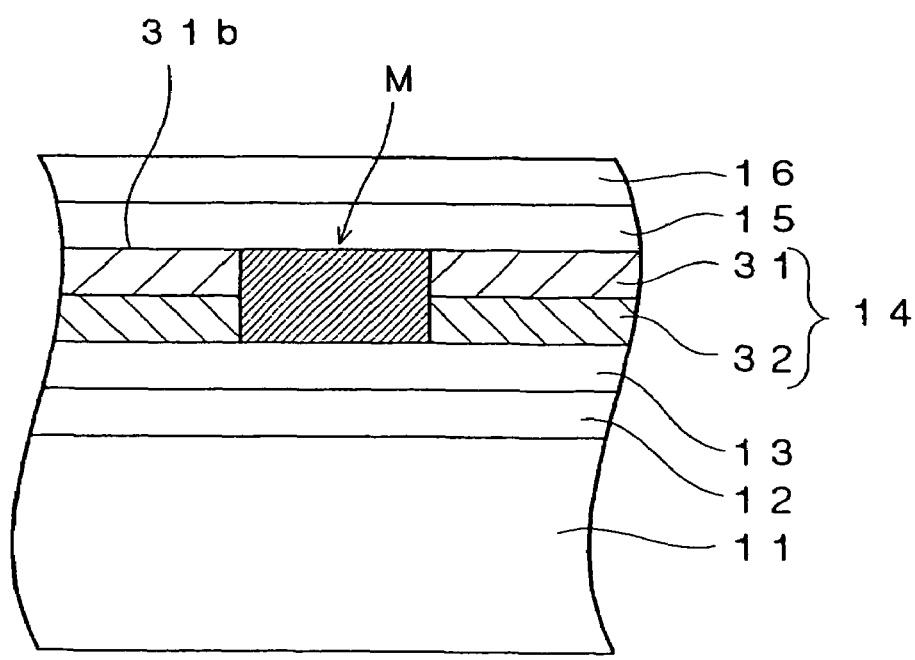

In a next-generation type optical recording medium 10 shown in FIGS. 1 and 2, it is required to record data at a high linear recording velocity and in a write-once type optical recording medium, a recording power Pw necessary for forming a recording mark is substantially proportional to the square root of the linear recording velocity. Therefore, it is necessary to set the recording power Pw of a pulse train pattern to a high level in order to record data in the optical recording medium 10 at a high linear recording velocity.

However, since the output of a semiconductor laser adapted for emitting a laser beam having a wavelength equal to or shorter than 450 nm and used for recording data in the next-generation type optical recording medium 10 is low and a semiconductor laser having a high output is expensive, even in the case where data are to be recorded in the optical recording medium 10 at a high linear recording velocity, it is necessary to select a pulse train pattern that enables data to be recorded therein at the lowest linear recording velocity possible.

In a study done by the inventors of the present invention, it was found that it was effective to increase the total amount of heat supplied for forming a recording mark M by modulating the power of the laser beam L10 using the single pulse pattern in order to record data in the optical recording medium 10 at a high linear recording velocity using a laser beam having a low recording power but that in the case where the linear recording velocity of data was low, if a recording mark was formed by modulating the power of the laser beam L10 using a single pulse pattern, the total amount of heat supplied for forming a recording mark became excessive and the recording mark became wider, whereby cross-talk of data increased. It was further found that this tendency became pronounced as the length of the recording mark became longer.

Therefore, in this embodiment, a pulse train pattern having a smaller number of pulses whose level is set to a level corresponding to a recording power Pw is employed as the linear recording velocity of data is higher, thereby modulating the power of a laser beam L10 to form a recording mark.

Concretely, in the case of employing the 1,7RLL Modulating Code, as shown in FIG. 3, the number of pulses of the pulse train pattern is selected in accordance with the linear recording velocity and the length of the recording mark M to be formed.

More specifically, as shown in FIG. 3, in the case where data are to be recorded in the optical recording medium 10 at a first linear recording velocity VL which is low, the basic pulse train pattern is selected as the pulse train pattern for modulating the power of the laser beam L10 and when an nT signal is to be recorded where n is an integer of 2 to 8 in the 1,7RLL Modulation Code, the basic pulse train pattern including (n−1) divided pulses is employed. In the case where a 2T signal is to be recorded, the number of the divided pulses becomes 1 and the basic pulse train pattern has the same pattern as that of the single pulse pattern.

To the contrary, in the case where data are to be recorded in the optical recording medium 10 at a third linear recording velocity VH which is high, the single pulse pattern is selected as the pulse train pattern for modulating the power of the laser beam L10. Here, the first linear recording velocity VL and the third linear recording velocity VH preferably are such that 2*VL is equal to or lower than VH and more preferably are such that 4*VL is equal to or lower than VH. Further, the third linear recording velocity VH is preferably equal to or higher than 10 m/sec and more preferably is equal to or higher than 20 m/sec.

On the other hand, in the case where data are to be recorded in the optical recording medium 10 at a second linear recording velocity VM higher than the first linear recording velocity VL and lower than the third linear recording velocity VH, the single pulse pattern is selected as the pulse train pattern for modulating the power of the laser beam L10 when the recording mark M to be formed is short, while the basic pulse train pattern is selected as the pulse train pattern for modulating the power of the laser beam L10 when the recording mark M to be formed is long.

Further, in the case where a recording mark M having the same length is to be formed in the optical recording medium 10 at a second linear recording velocity VM higher than the first linear recording velocity VL and lower than the third linear recording velocity VH, the pulse train pattern is determined so that the number of pulses included in the pulse train pattern is larger as the linear recording velocity VM becomes lower and on the other hand, when the linear recording velocity VM is the same in the case where a recording mark M having the same length is to be formed in the optical recording medium 10 at a second linear recording velocity VM higher than the first linear recording velocity VL and lower than the third linear recording velocity VH, the pulse train pattern is determined so that the number of pulses included in the pulse train pattern is larger as the recording mark becomes longer.

Figure 9:
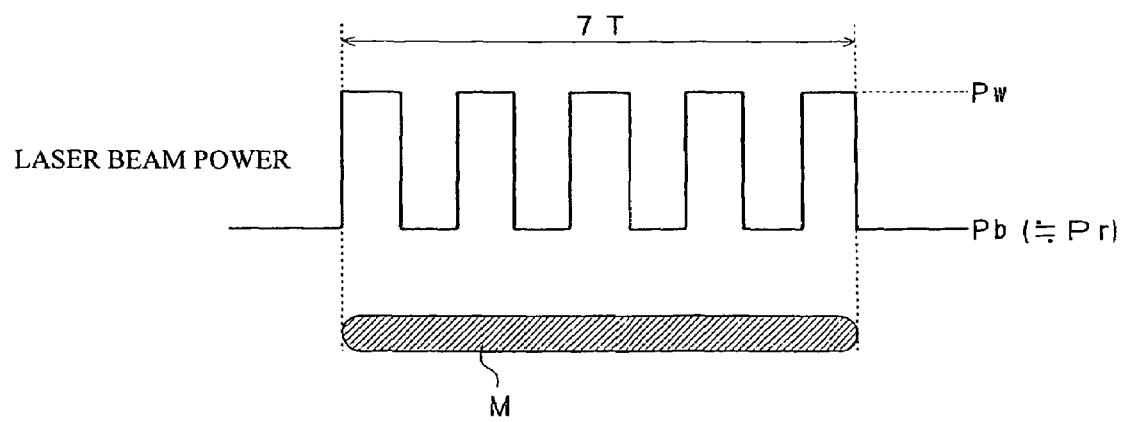
FIG. 9 is a diagram showing a typical pulse train pattern (basic pulse train pattern) used for recording data in a DVD-R including a recording layer containing an organic dye and shows a pulse train pattern for recording a 7T signal in the 8/16 Modulation Code.

In this embodiment, the basic pulse train pattern includes not only the basic pulse train pattern shown in FIG. 9 and including (n−1) divided pulses but also a basic pulse train pattern including n or (n−2) divided pulses. It is preferable to employ a basic pulse train pattern including (n−2) divided pulses in the 8/16 Modulation Code and employ a pulse train pattern including (n−1) divided pulses in the 1,7RLL Modulation Code.

Figure 4:
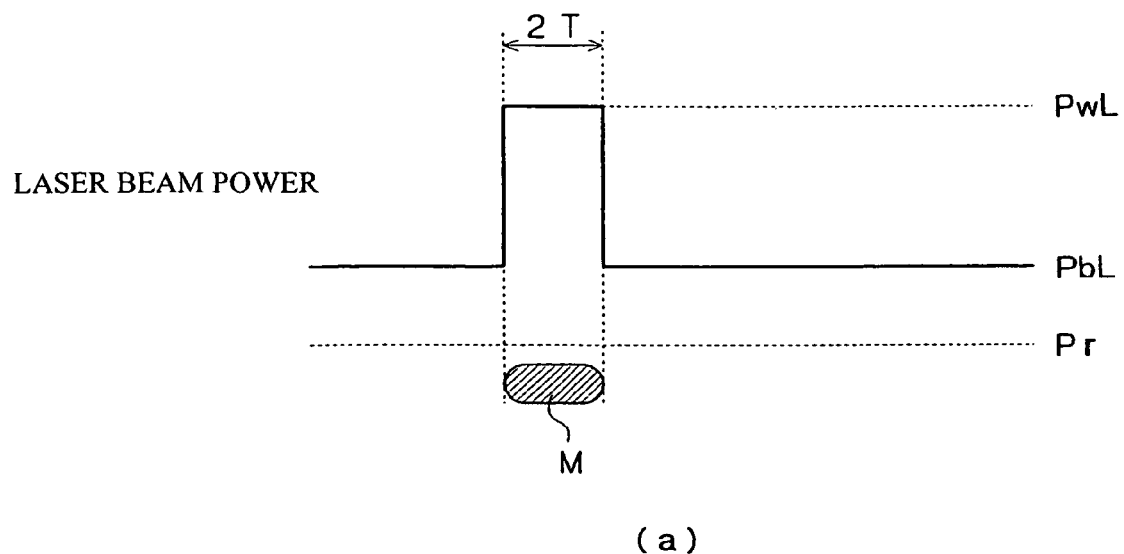
Figure 4:
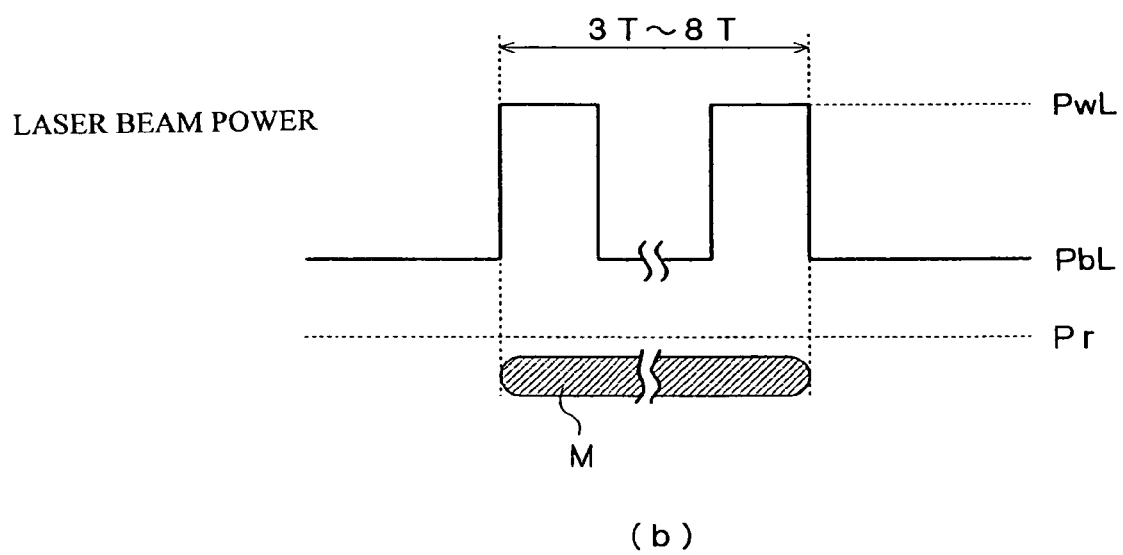

FIG. 4 is a set of diagrams showing pulse train patterns used for recording data in an optical recording medium at the first linear recording velocity VL, wherein FIG. 4(a) shows a pulse train pattern used for recording a 2T signal and FIG. 4(b) shows a pulse train pattern used for recording one of a 3T signal to an 8T signal.

As shown in FIG. 4(a) and FIG. 4(b), in the case where data are to be recorded in the optical recording medium 10 at the first linear recording velocity VL, the recording pulse for forming a recording mark M is divided into (n−1) divided pulses and the power of the laser beam L10 is set to a recording power PwL at the peak of each of the divided pulses and set to a bottom power PbL at the other portions of the pulse.

In this manner, in the case where data are to be recorded in the optical recording medium 10 at the first linear recording velocity VL, since the recording pulse for forming the recording mark M is divided into (n−1) divided pulses and the power of the laser beam L10 is set to a recording power PWL at the peak of each of the divided pulses and set to a bottom power PbL at the other portions of the pulse, it is possible to prevent a total amount of heat supplied for forming the recording mark M from becoming excessive and it is therefore possible to effectively prevent the recording mark from becoming wider and cross-talk of data from increasing.

The recording power PwL is set to a high level at which the element contained in the first recording layer 31 as a primary component and the element contained in the second recording layer 32 as a primary component can be heated and mixed to form a record mark M when a laser beam having the recording power PwL is projected onto the optical recording medium 10. On the other hand, the first bottom power PbL is set to a low level at which the element contained in the first recording layer 31 as a primary component and the element contained in the second recording layer 32 as a primary component cannot substantially be mixed even when a laser beam having the first bottom power PbL is projected onto the optical recording medium 10.

Further, as shown in FIG. 4(a) and FIG. 4(b), the bottom power PbL is set to a level higher than a reproducing power Pr.

If the level of the bottom power PbL is set to a higher level than the reproducing power Pr in this manner, it is possible to augment the heating of the recording layer by the laser beam L10 having the recording power PwL by the laser beam L10 having the bottom power PbL and the recording power PWL can be therefore set to a low level.

Figure 5:
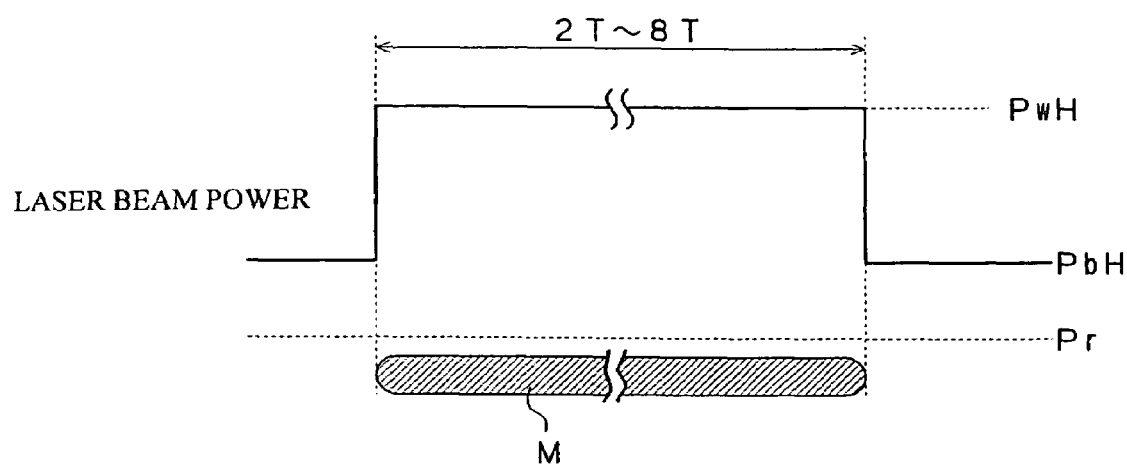
FIG. 5 is a diagram showing a pulse train patterns used for recording data, namely, one of a 2T signal to an 8T signal in an optical recording medium at a third linear recording velocity VH.

FIG. 5 is a diagram showing a pulse train patterns used for recording data, namely one of a 2T signal to an 8T signal in the optical recording medium 10 at the third linear recording velocity VH.

As shown in FIG. 5, in the case where data are to be recorded in the optical recording medium 10 at the third linear recording velocity VH, the single pulse train pattern is selected as a pulse train pattern for modulating the power of the laser beam L10 and the power of the laser beam L10 is set to a recording layer PwH at regions where recording marks M are to be formed and set to a bottom power PbH at other portions of the pulse.

Therefore, since the total amount of heat supplied for forming a recording mark M can be increased, it is possible to set the recording layer PwH to a low level.

The recording power PwH is set to a high level at which the element contained in the first recording layer 31 as a primary component and the element contained in the second recording layer 32 as a primary component can be heated and mixed to form a record mark M when a laser beam having the recording power PwH is projected onto the optical recording medium 10. On the other hand, the first bottom power PbH is set to a low level at which the element contained in the first recording layer 31 as a primary component and the element contained in the second recording layer 32 as a primary component cannot substantially be mixed even when a laser beam having the first bottom power PbH is projected onto the optical recording medium 10.

The bottom power PbH is set to a level higher than a reproducing power Pr. If the level of the bottom power PbH is set to a higher level than the reproducing power Pr in this manner, it is possible to augment the heating of the recording layer by the laser beam L10 having the recording power PWH by the laser beam L10 having the bottom power PbH and the recording power PwH can be therefore set to a low level.

Figure 6:
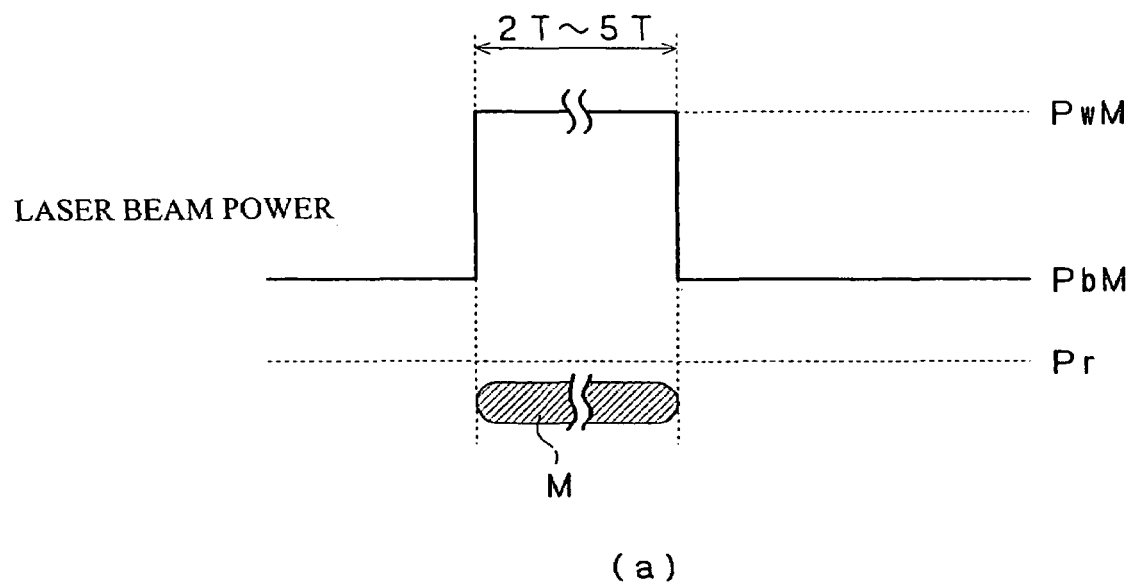
Figure 6:
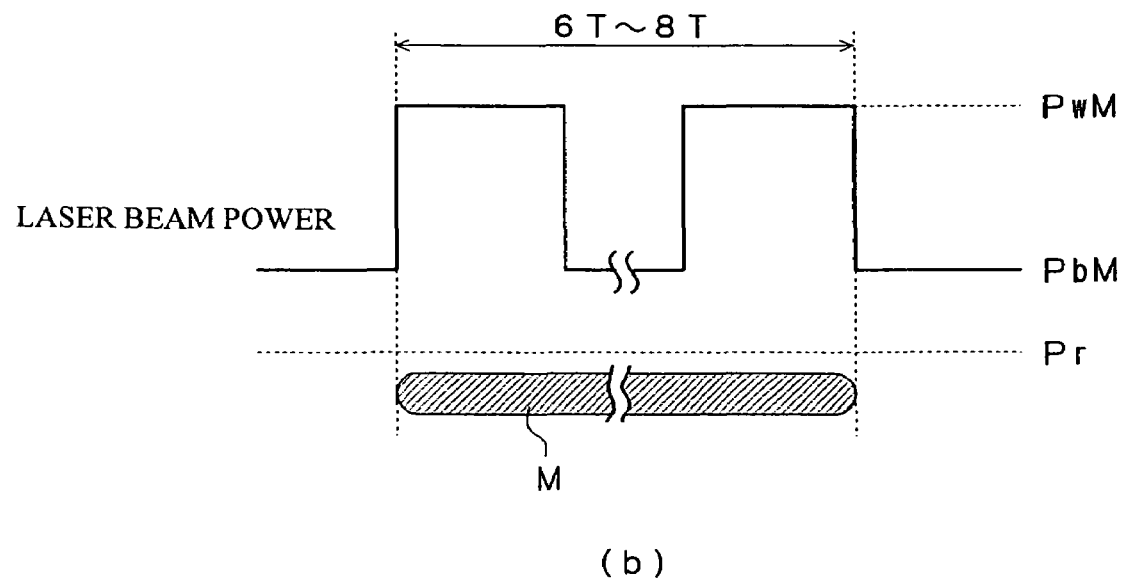

FIG. 6 is a set of diagrams showing pulse train patterns used for recording data in the optical recording medium 10 at the second linear recording velocity VM higher than the first linear recording velocity VL and lower than the third linear recording velocity VH, wherein FIG. 6(a) shows a pulse train pattern used for recording one of a 2T signal to a 5T signal and FIG. 6(b) shows a pulse train pattern used for recording one of a 6T signal to an 8T signal.

As shown in FIG. 6(a), in the case where data are to be recorded in the optical recording medium 10 at the second linear recording velocity VM lower than the third linear recording velocity VH, the single pulse pattern is selected as a pulse train pattern for modulating the power of the laser beam L10 when one of a 2T signal to a 5T signal is to be recorded and the basic pulse train pattern including 2 to 4 divided pulses is selected when one of a 6T signal to an 8T signal is to be recorded. In these cases, the power of the laser beam L10 is modulated so as to be equal to a recording power PwM at the peak of the single pulse or each of the divided pulses and equal to a bottom power PbM at other portions of the pulse.

If a pulse train pattern for modulating the power of the laser beam L10 is determined in this manner, when one of a 2T signal to a 5T signal is to be recorded, since the total amount of heat supplied for forming a recording mark M becomes large, it is possible to set the recording power PwM to a low level. On the other hand, since it is possible to prevent the total amount of heat supplied for forming a recording mark M from becoming excessive, it is possible to effectively prevent a long recording mark M formed using one of a 6T signal to an 8T signal from becoming wider and cross-talk of data from increasing.

The recording power PwM is set to a high level at which the element contained in the first recording layer 31 as a primary component and the element contained in the second recording layer 32 as a primary component can be heated and mixed to form a record mark M when a laser beam having the recording power PwM is projected onto the optical recording medium 10. On the other hand, the first bottom power PbM is set to a low level at which the element contained in the first recording layer 31 as a primary component and the element contained in the second recording layer 32 as a primary component cannot substantially be mixed even when a laser beam having the first bottom power PbM is projected onto the optical recording medium 10.

The bottom power PbM is set to a level higher than a reproducing power Pr. If the level of the bottom power PbM is set to a higher level than the reproducing power Pr in this manner, it is possible to augment the heating of the recording layer by the laser beam L10 having the recording power PWM by the laser beam L10 having the bottom power PbM and the recording power PwM can be therefore set to a low level.

It is preferable for the bottom power PbL of the pulse train pattern used for recording data at the first linear recording velocity VL, the bottom power PbH of the pulse train pattern used for recording data at the third linear recording velocity VH and the bottom power PbM of the pulse train pattern used for recording data at the second linear recording velocity VM to be such that PbL is lower than PbM and PbM is equal to or lower than PbH, more preferable for them to be such that 3*PbL is equal to or lower than PbM and PbM is equal to or lower than PbH and most preferable for them to be such that 5*PbL is equal to or lower than PbM and PbM is lower than PbH.

Further, it is preferable to determine the pulse train patterns so that a ratio (PbL/PwL) of the bottom power PbL to the recording power PwL of the pulse train pattern used for recording data at the first linear recording velocity VL, a ratio (PbH/PwH) of the bottom power PbH to the recording power PwH of the pulse train pattern used for recording data at the third linear recording velocity VH and a ratio (PbM/PwM) of the bottom power PbM to the recording power PwM of the pulse train pattern used for recording data at the second linear recording velocity VM are such that (PbL/PwL) is lower than (PbM/PwM) and (PbM/PwM) is equal to or lower than (PbH/PwH) and it is more preferable for the ratios to be such that 3*(PbL/PwL) is equal to or lower than (PbM/PwM) and (PbM/PwM) is equal to or lower than (PbH/PwH) and most preferable for the ratios to be such that 5*(PbL/PwL) is equal to or lower than (PbM/PwM) and (PbM/PWM) is equal to or lower than (PbH/PwH).

In the case where the recording powers and the bottom powers of the pulse train patterns used for modulating the power of a laser beam are set in this manner, when data are to be recorded at different linear recording velocities in a (multi-velocity recording) system in which data can be recorded by selecting a desired linear recording velocity selected from among a plurality of linear recording velocities, it is possible to set the recording powers to substantially the same level.

Therefore, in this embodiment, since it is possible to set the recording power PwM to a low level and set recording powers to substantially the same level in the case of recording data at different linear recording velocities, it is possible to employ a relatively inexpensive semiconductor laser having a low output.

According to this embodiment, since the single pulse pattern is selected as the pulse train pattern for modulating the power of the laser beam L10 in the case where data are to be recorded at the third linear recording velocity VH, which is high, it is possible to increase the total amount of heat supplied for forming a recording mark M and it is therefore possible to record data in the optical recording medium 10 with the recording power PwH set to a lower level.

Further, according to this embodiment, in the case where data are to be recorded at the first linear recording velocity VL, which is low, since the basic pulse train pattern is selected as the pulse train pattern for modulating the power of a laser beam L10 and the basic pulse train pattern including (n−1) divided pulses when an nT signal is to be recorded where n is an integer of 2 to 8 in the (1,7)RLL Modulation Code, it is possible to effectively prevent the total amount of heat supplied for forming a recording mark M from increasing excessively, whereby it is possible to prevent widening of the width of the recording mark M and increase in cross-talk of data.

Therefore, according to this embodiment, even in the case where data are to be recorded in an optical recording medium 10 at a high linear recording velocity, it is possible to employ a relatively inexpensive semiconductor laser having a low output.

Figure 7:
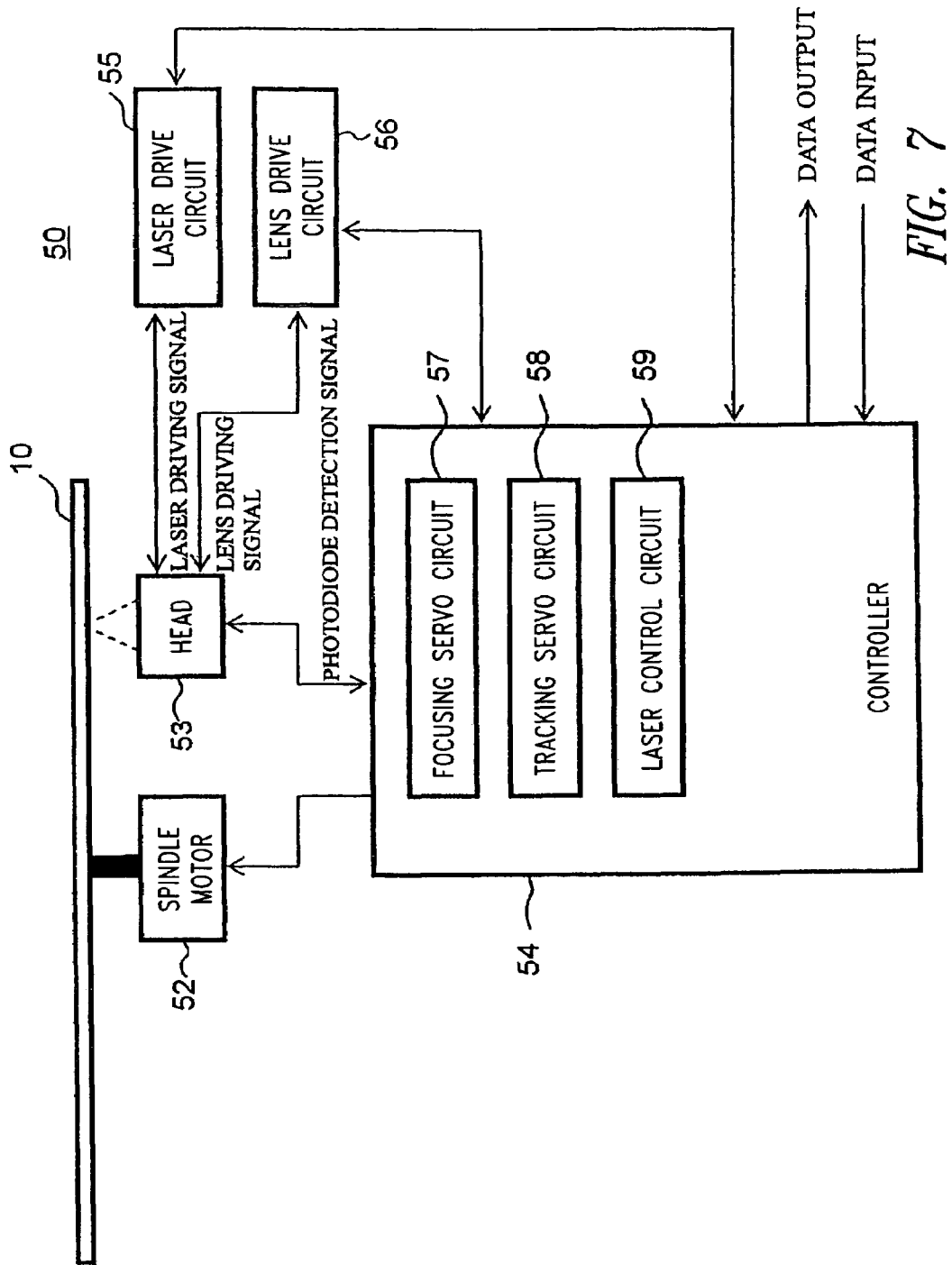
FIG. 7 is a block diagram showing a data recording and reproducing apparatus that is a preferred embodiment of the present invention.
Figure 8:
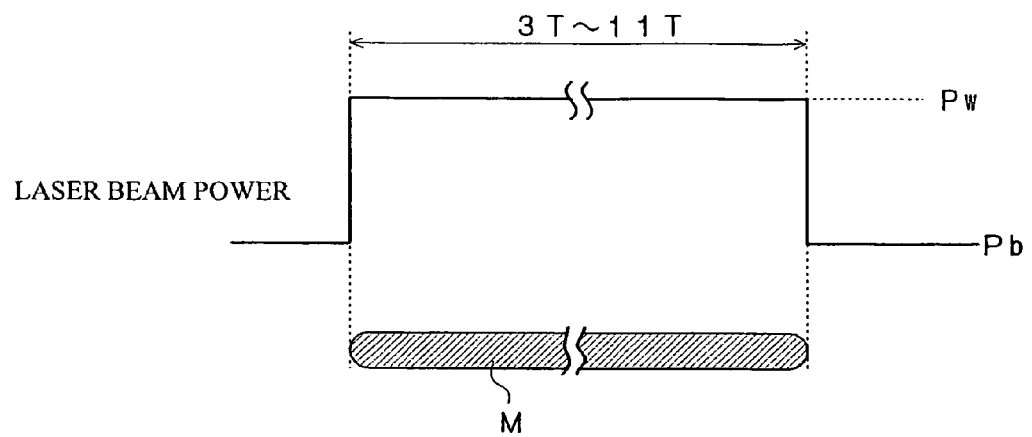
FIG. 8 is a diagram showing a typical pulse train pattern used for recording data in a CD-R including a recording layer containing an organic dye and shows a pulse train pattern for recording one of a 3T signal to an 11T signal in the EFM Modulation Code.

FIG. 7 is a block diagram showing a data recording apparatus that is a preferred embodiment of the present invention.

As shown in FIG. 7, a data recording apparatus 100 includes a spindle motor 52 for rotating the optical recording medium 10, a head 53 for projecting a laser beam onto the optical recording medium 10 and receiving the light reflected by the optical recording medium 10, a controller 54 for controlling the operation of the spindle motor 52 and the head 53, a laser drive circuit 55 for feeding a laser drive signal to the head 53, and a lens drive circuit 56 for feeding a lens drive signal to the optical head 53.

As shown in FIG. 7, the controller 54 includes a focus servo tracking circuit 57, a tracking servo circuit 58 and a laser control circuit 59.

When the focus servo tracking circuit 57 is activated, a laser beam L10 is focused onto the first recording layer 51 of the rotating optical recording medium 10 and when the tracking servo circuit 58 is activated, the spot of the laser beam L10 automatically follows the track of the optical recording medium 10.

As shown in FIG. 7, each of the focus servo tracking circuit 57 and the tracking servo circuit 58 has an auto-gain control function for automatically adjusting the focus gain and an auto-gain control function for automatically adjusting the tracking gain. Further, the laser control circuit 59 is adapted to generate a laser drive signal to be supplied by the laser drive circuit 55.

In this embodiment, data for identifying the above described pulse train patterns are recorded in the optical recording medium 10 together with data for identifying various recording conditions, such as a linear recording velocity necessary for recording data, as data for setting recording conditions in the form of wobbles or pre-pits.

Therefore, the laser control circuit 59 reads data for setting recording conditions recorded in the optical recording medium 10 prior to recording data in the optical recording medium 10, selects the desired pulse train pattern based on the thus read data for setting recording conditions to generate a laser drive signal and causes the laser drive circuit 55 to output it to the head 53.

Thus, data are recorded in the optical recording medium 10 in accordance with the desired recording strategy.

According to this embodiment, the optical recording medium 10 is recorded with data for identifying the pulse train patterns together with data for identifying various recording conditions, such as a linear recording velocity necessary for recording data, as data for setting recording conditions and prior to recording data in the optical recording medium 10, the laser control circuit 59 reads data for setting recording conditions recorded in the optical recording medium 10, selects the desired pulse train pattern based on the thus read data for setting recording conditions to generate a laser drive signal and control the head 53 for projecting a laser beam onto the optical recording medium 10. Therefore, it is possible to record data in accordance with the desired recording strategy.

WORKING EXAMPLES AND A COMPARATIVE EXAMPLE

Hereinafter, working examples and a comparative example will be set out in order to further clarify the advantages of the present invention.

Working Example 1

An optical recording medium having the same configuration as that of the optical recording medium 1 shown in FIG. 1 was fabricated in the following manner.

A polycarbonate substrate having a thickness of 1.1 mm and a diameter of 120 mm was first set on a sputtering apparatus. Then, a reflective layer containing a mixture of Ag, Pd and Cu and having a thickness of 100 nm, a second dielectric layer containing a mixture of ZnS and $SiO_2$ and having a thickness of 30 nm, a second recording layer containing Cu as a primary component and having a thickness of 5 nm, a first recording layer containing Si as a primary component and having a thickness of 5 nm, a first dielectric layer containing the mixture of ZnS and $SiO_2$ and having a thickness of 25 nm were sequentially formed on the polycarbonate substrate using the sputtering process.

The mole ratio of ZnS to $SiO_2$ in the mixture of ZnS and $SiO_2$ contained in the first dielectric layer and the second dielectric layer was 80:20.

Further, the first dielectric layer was coated using the spin coating method with an acrylic ultraviolet ray curable resin to form a coating layer and the coating layer was irradiated with ultraviolet rays, thereby curing the acrylic ultraviolet ray curable resin to form a light transmission layer having a thickness of 100 μm.

The thus fabricated optical recording medium was set in an optical recording medium evaluation apparatus "DDU1000" (Product Name) manufactured by Pulstec Industrial Co., Ltd. Then, a blue laser beam having a wavelength of 405 nm was employed as the laser beam for recording data and the laser beam was condensed onto the optical recording medium via the light transmission layer using an objective lens whose numerical aperture was 0.85, and data were recorded therein.

As a record signal, a random signal including a 2T signal to an 8T signal in no particular order was used and the power of a laser beam was modulated using the first pulse train pattern including (n−1) divided pulses irrespective of the recording signal Data were recorded by fixing the bottom power Pb of the first pulse train pattern to 0.5 mW and varying the recording power Pw between the first linear recording velocity VL, the second linear recording velocity VM and the third linear recording velocity VH.

The first linear recording velocity VL was set to 5.3 m/sec (channel clock: 66 MHz), the second linear recording velocity VM was set to 10.6 m/sec (channel clock: 132-MHz) and the third linear recording velocity VH was set to 21.2 m/sec (channel clock: 263 MHz).

At the first linear recording velocity VL, when the format efficiency was 80%, the data transfer rate was about 35 Mbps and the ratio of the shortest blank region interval to the linear recording velocity (shortest blank region interval/linear recording velocity) was 30.4 nsec. Further, at the second linear recording velocity VM, when the format efficiency was 80%, the data transfer rate was about 70 Mbps and the ratio of the shortest blank region interval to the linear recording velocity (shortest blank region interval/linear recording velocity) was 15.2 nsec. Moreover, at the third linear recording velocity VH, when the format efficiency was 80%, the data transfer rate was about 140 Mbps and the ratio of the shortest blank region interval to the linear recording velocity (shortest blank region interval/linear recording velocity) was 7.6 nsec.

Then, data recorded in the optical recording medium were reproduced using the above mentioned optical recording medium evaluation apparatus and the recording power Pw of the laser beam at which clock jitter of the reproduced signal was minimum was measured and determined as the optical recording power. When data were to be reproduced, a laser beam having a wavelength of 405 nm and an objective lens having a numerical aperture NA of were employed. The fluctuation a of the reproduced signal was measured using a time interval analyzer and the clock jitter was calculated as aftw, where Tw was one clock period.

The results of the measurement are shown in Table 1.

Working Example 2

Data were recorded in the optical recording medium in the manner of Working Example 1 except that the power of the laser beam was modulated using the second pulse train pattern constituted so that the single pulse pattern was selected when one of a 2T signal to a 5T signal was recorded and the basic pulse train pattern including two to four divided pulses was selected when one of a 6T signal to an 8T signal was recorded. Then, data recorded in the optical recording medium were reproduced and the recording power Pw of the laser beam at which clock jitter of the reproduced signal was minimum was measured and determined as the optical recording power.

The results of the measurement are shown in Table 1.

Working Example 3

Data were recorded in the optical recording medium in the manner of Working Example 1 except that the power of the laser beam was modulated using the third pulse train pattern constituted so that the single pulse pattern was selected irrespective of the recording signal. Then, data recorded in the optical recording medium were reproduced and the recording power Pw of the laser beam at which clock jitter of the reproduced signal was minimum was measured and determined as the optical recording power.

The results of the measurement are shown in Table 1.

TABLE 1

|  | Pb = 0.5 mW | | |
|---|---|---|---|
|  | First linear recording velocity (VL) | Second linear recording velocity (VM) | Third linear recording velocity (VH) |
| First pulse train pattern | 4.5 mW | 6.3 mW | — |
| Second pulse train pattern | 3.5 mW | 4.7 mW | 6.5 mW |
| Third pulse train patter | 3.1 mW | 4.1 mW | 5.3 mW |

As shown in Table 1, it was found that in the case where the bottom power Pb was fixed at 0.5 mW, the optimum recording power became higher as the linear recording velocity increased.

Further, it was found that at each linear recording velocity, the optical recording powers became lower in the order of the first pulse train pattern, the second pulse train pattern and the third pulse train pattern.

However, since the rate of laser beam power modulation was restricted in the optical recording medium evaluation apparatus used for the experiments, data could not be recorded in the optical recording medium at the third linear recording velocity VH by modulating the power of the laser beam in accordance with the third pulse train pattern.

Working Example 4

Data were recorded in the optical recording medium in the manner of Working Example 1 except that the bottom power Pb of the first pulse train pattern was set to 1.5 mW when data were to be recorded in the optical recording medium at the first linear recording velocity VL, that the bottom power Pb of the first pulse train pattern was set to 2.0 mW when data were to be recorded in the optical recording medium at the second linear recording velocity VM and that the bottom power Pb of the first pulse train pattern was set to 2.5 mW when data were to be recorded in the optical recording medium at the third linear recording velocity VH. Then, data recorded in the optical recording medium were reproduced and the recording power Pw of the laser beam at which clock jitter of the reproduced signal was minimum was measured and determined as the optical recording power.

The results of the measurement are shown in Table 2.

In Table 2, each value in parentheses indicates the difference between the optical recording power obtained in this Working Example and that obtained in Working Example 1.

Working Example 5

Data were recorded in the optical recording medium in the manner of Working Example 1 except that the bottom power Pb of the second pulse train pattern was set to 1.5 mW when data were to be recorded in the optical recording medium at the first linear recording velocity VL, that the bottom power Pb of the second pulse train pattern was set to 2.0 mW when data were to be recorded in the optical recording medium at the second linear recording velocity VM and that the bottom power Pb of the second pulse train pattern was set to 2.5 mW when data were to be recorded in the optical recording medium at the third linear recording velocity VH. Then, data recorded in the optical recording medium were reproduced and the recording power Pw of the laser beam at which clock jitter of the reproduced signal was minimum was measured and determined as the optical recording power.

The results of the measurement are shown in Table 2.

In Table 2, each value in parentheses indicates the difference between the optical recording power obtained in this Working Example and that obtained in Working Example 2.

Working Example 6

Data were recorded in the optical recording medium in the manner of Working Example 1 except that the bottom power Pb of the third pulse train pattern was set to 1.5 mW when data were to be recorded in the optical recording medium at the first linear recording velocity VL, that the bottom power Pb of the third pulse train pattern was set to 2.0 mW when data were to be recorded in the optical recording medium at the second linear recording velocity VM and that the bottom power Pb of the third pulse train pattern was set to 2.5 mW when data were to be recorded in the optical recording medium at the third linear recording velocity VH. Then, data recorded in the optical recording medium were reproduced and the recording power Pw of the laser beam at which clock jitter of the reproduced signal was minimum was measured and determined as the optical recording power.

The results of the measurement are shown in Table 2.

In Table 2, each value in parentheses indicates the difference between the optical recording power obtained in this Working example and that obtained in Working Example 3.

TABLE 2

|  | Pb = 1.5 mW First linear recording velocity (VL) | Pb = 2.0 mW Second linear recording velocity (VM) | Pb = 2.5 mW Third linear recording velocity (VH) |
|---|---|---|---|
| First pulse train pattern | 4.2 mW (−0.3) | 4.8 mW (−1.5) | — |
| Second pulse train pattern | 3.3 mW (−0.2) | 3.9 mW (−0.8) | 5.2 mW (−1.3) |
| Third pulse train patter | 3.0 mW (−0.1) | 3.4 mW (−0.7) | 4.3 mW (−1.0) |

As shown in Table 2, it was found that in the case where the bottom power Pb of each of the pulse train patterns was set to 1.5 mW when data were to be recorded in the optical recording medium at the first linear recording velocity VL, the bottom power Pb of each of the pulse train patterns was set to 2.0 mW when data were to be recorded in the optical recording medium at the second linear recording velocity VM and that the bottom power Pb of each of the pulse train patterns was set to 2.5 mW when data were to be recorded in the optical recording medium at the third linear recording velocity VH, the optimum recording power Pw decreased in comparison of the case of setting the bottom power Pb of each of the pulse train patterns to 0.5 mW.

Further, it was found that the reduction in the optimum recording power Pw became larger as the linear recording velocity increased. It is reasonable to assume that the reason for this finding is as follows. Specifically, since the influence of heat transmitted from neighboring recording marks becomes great as the linear recording velocity increases, the reduction in the optimum recording power Pw caused by setting the bottom power Pb of each of the pulse train patterns to a high level becomes great as the linear recording velocity increases.

Working Example 7

The recording power Pw was set to the optimum recording power obtained in Working Example 4 and a random signal including a 2T signal to an 8T signal in no particular order was recorded on one track of the optical recording medium in the manner of Working Example 4. Then, the thus recorded signal was reproduced and clock jitter of the reproduced signal was measured. Hereinafter, the thus measured clock jitter is referred to as "single jitter."

Further, a random signal including a 2T signal to an 8T signal in no particular order was recorded on three tracks adjacent to each other under the same recording conditions. Then, the signal recorded in the central track was reproduced and clock jitter of the reproduced signal was measured. Hereinafter, the thus measured clock jitter is referred to as "cross jitter."

Further, the difference between the single jitter and the cross jitter was determined for each of the linear recording velocities.

The results of the determination are shown in Table 3.

Working Example 8

The recording power Pw was set to the optimum recording power obtained in Working Example 5 and a random signal including a 2T signal to an 8T signal in no particular order was recorded on one track of the optical recording medium in the manner of Working Example 5. Then, the thus recorded signal was reproduced and single jitter of the reproduced signal was measured.

Further, a random signal including a 2T signal to an 8T signal in no particular order was recorded on three tracks adjacent with each other under the same recording conditions. Then, the signal recorded in the central track was reproduced and cross jitter of a reproduced signal was measured.

Further, a difference between the single jitter and the cross jitter was determined for each of the linear recording velocities.

The results of the determination are shown in Table 3.

Working Example 9

The recording power Pw was set to the optimum recording power obtained in Working Example 6 and a random signal including a 2T signal to an 8T signal in no particular order was recorded on one track of the optical recording medium in the manner of Working Example 6. Then, the thus recorded signal was reproduced and single jitter of the reproduced signal was measured.

Further, a random signal including a 2T signal to an 8T signal in no particular order was recorded on three tracks adjacent with each other under the same recording conditions. Then, the signal recorded in the central track was reproduced and cross jitter of the reproduced signal was measured.

Further, the difference between the single jitter and the cross jitter was determined for each of the linear recording velocities.

The results of the determination are shown in Table 3.

TABLE 3

|  | First linear recording velocity (VL) | Second linear recording velocity (VM) | Third linear recording velocity (VH) |
| --- | --- | --- | --- |
| First pulse train pattern | 0.5% | 0.4% | — |
| Second pulse train pattern | 0.7% | 0.5% | 0.5% |
| Third pulse train patter | 1.0% | 0.8% | 0.5% |

As shown in Table 3, it was found that in the case where data were recorded in the optical recording medium at each of the first linear recording velocity VL and the second linear recording velocity VM, the difference between single jitter and cross jitter became larger and cross-talk of data increased in the order of the first pulse train pattern, the second pulse train pattern and the third pulse train pattern. It is reasonable to assume that this was because the width of the recording mark became larger in the order of the first pulse train pattern, the second pulse train pattern and the third pulse train pattern.

Further, it was found that the increase in the difference between single jitter and cross jitter in the order of the first pulse train pattern, the second pulse train pattern and the third pulse train pattern was larger in the case of recording data at the first linear recording velocity VL than that in the case of recording data at the second linear recording velocity VM.

On the other hand, it was found that in the case where data were recorded at the third linear recording velocity VH, there was no significant difference between the difference between single jitter and cross jitter obtained when the second pulse train pattern was employed and that obtained when the third pulse train pattern was employed.

From Working Example 1 to Working Example 9, it was found that since in the case of recording data in the optical recording medium at the first linear recording velocity VL crosstalk of data increased when the power of a laser beam was modulated using the second pulse train pattern or the third pulse train pattern, it was preferable to modulate the power of a laser beam using the first pulse train pattern in the case of recording data in the optical recording medium at the first linear recording velocity VL. It is reasonable to conclude that the reason for this finding is as follows. Specifically, in the case of recording data in the optical recording medium at the first linear recording velocity VL, since the linear recording velocity is low, it is not basically required to increase the level of a recording power Pw. As a consequence, if the level of the recording power Pw is increased, cross-talk of data increases.

Further, from Working Example 1 to Working Example 9, it was found that although in the case of recording data in the optical recording medium at the second linear recording velocity VM, cross-talk of data became larger in the order of the first pulse train pattern, the second pulse train pattern and the third pulse train pattern, it was more important to reduce the level of the recording power Pw in the case of recording data in the optical recording medium at the second linear recording velocity VM and it was therefore preferable to modulate the power of the laser beam using the second pulse train pattern.

Furthermore, from Working Example 1 to Working Example 9, it was found that in the case of recording data in the optical recording medium at the third linear recording velocity VH, since it was possible to set the level of the recording power Pw to the lowest level when the power of the laser beam was modulated using the third pulse train pattern and there was no significant difference in the level of cross-talk of data between when the power of the laser beam was modulated using the third pulse train pattern and when it was modulated by the second pulse train pattern, it was preferable to modulate the power of the laser beam using the third pulse train pattern in the case of recording data in the optical recording medium at the third linear recording velocity VH.

The present invention has thus been shown and described with reference to a specific embodiment and Working Examples. However, it should be noted that the present invention is in no way limited to the details of the described arrangements but changes and modifications may be made without departing from the scope of the appended claims.

For example, in the above described embodiment and Working Examples, although the first recording layer 31 and the second recording layer 32 are formed in contact with each other, it is not absolutely necessary to form the first recording layer 31 and the second recording layer 32 in contact with each other but it is sufficient for the second recording layer 32 to be so located in the vicinity of the first recording layer 31 as to enable formation of a mixed region including the primary component element of the first recording layer 31 and the primary component element of the second recording layer 32 when the region is irradiated with a laser beam. Further, one or more other layers such as a dielectric layer may be interposed between the first recording layer 31 and the second recording layer 32.

Further, in the above described embodiment, although the first recording layer 31 contains an element selected from the group consisting of Si, Ge, Sn, Mg, In, Zn, Bi and Al as a primary component and the second recording layer 32 contains Cu as a primary component, it is not absolutely necessary for the first recording layer 31 to contain an element selected from the group consisting of Si, Ge, Sn, Mg, In, Zn, Bi and Al as a primary component and for the second recording layer 32 to contain Cu as a primary component and the first recording layer 31 may contain an element selected from the group consisting of Si, Ge, C, Sn, Zn and Cu as a primary component and the second recording layer 32 may contain Al as a primary component. Further, the first recording layer 31 may contain an element selected from the group consisting of Si, Ge, C and Al as a primary component and the second recording layer 32 may contain Zn as a primary component. Moreover, it is sufficient for the first recording layer 31 and the second recording layer 32 to contain different elements from each other and contain an element selected from the group consisting of Al, Si, Ge, C, Sn, Au, Zn, Cu, B, Mg, Ti, Mn, Fe, Ga, Zr, Ag and Pt as a primary component.

Furthermore, in the above described embodiment and Working Examples, although the optical recording medium 10 includes the first recording layer 31 and the second recording layer 32, the optical recording medium may include one or more recording layers containing an element selected from the group consisting of Si, Ge, Sn, Mg, In, Zn, Bi and Al as a primary component or one or more recording layers containing Al as a primary element, in addition to the first recording layer 31 and the second recording layer 32.

Moreover, although the first recording layer 31 is disposed on the side of the light transmission layer 16 and the second recording layer 32 is disposed on the side of the substrate 11 in the above described embodiment and working examples, it is possible to dispose the first recording layer 31 on the side of the substrate 11 and the second recording layer 32 on the side of the light transmission layer 16.

Further, in the above described embodiment and Working Examples, the optical recording medium 10 includes the first dielectric layer 15 and the second dielectric layer 13 and the first recording layer 31 and the second recording layer 32 are disposed between the first dielectric layer 15 and the second dielectric layer 13. However, it is not absolutely necessary for the optical recording medium 10 to include the first dielectric layer 15 and the second dielectric layer 13, i.e., the optical recording medium 10 may include no dielectric layer. Further, the optical recording medium 10 may include a single dielectric layer and in such case the dielectric layer may be disposed on either the side of the substrate 11 or the side of the light transmission layer 16 with respect to the first recording layer 31 and the second recording layer 32.

Furthermore, in Working Examples, although the first recording layer 31 and the second recording layer 32 are formed so as to have the same thickness in the above described embodiment and working examples, it is not absolutely necessary to form the first recording layer 31 and the second recording layer 32 so as to have the same thickness.

Moreover, in the above described embodiment and Working Examples, although the optical recording medium 10 is provided with the reflective layer 12, if the level of reflected light in the recording mark M formed by the mixing an element contained in the first recording layer as a primary component and Zn contained in the second recording layer as a primary component and the level of reflected light in regions onto which the laser beam was not projected greatly differ from each other, the reflective layer may be omitted.

Furthermore, in the embodiment shown in FIG. 6, although the data for setting recording conditions are recorded in the optical recording medium 10 in the form of wobbles or pre-pits, data for setting recording conditions may be recorded in the first recording layer 31 or the second recording layer 32.

Moreover, in the embodiment shown in FIG. 6, although the focus servo tracking circuit 57, the tracking servo circuit 58 and the laser control circuit 59 are incorporated into the controller 54, it is not absolutely necessary to incorporate the focus servo tracking circuit 57, the tracking servo circuit 58 and the laser control circuit 59 into the controller 54, and the focus servo tracking circuit 57, the tracking servo circuit 58 and the laser control circuit 59 may be provided separately from the controller 54. Moreover, it is alternatively possible to install software for accomplishing functions of the focus servo tracking circuit 57, the tracking servo circuit 58 and the laser control circuit 59 in the controller 54.

Further, in the above described embodiment and Working Examples, although the explanation was made as to the case where data are recorded in a next-generation type optical recording medium 10 and where it is required to employ a semiconductor laser having a high output, application of the present invention is not limited to the case of recording data in a next-generation type optical recording medium but the present invention can be widely applied to the case of recording data in a write-once type optical recording medium other than a next-generation type optical recording medium.

Furthermore, in the above described embodiments, a pulse train pattern is selected based on the linear recording velocity, because the width of a recording mark M tends to become wider and cross-talk of data becomes larger as linear recording velocity decreases. However, since cross-talk of data caused by the widening of a recording mark M increases as the track pitch becomes narrower and the spot diameter of the laser beam becomes larger, the pulse train pattern may be selected taking into account the ratio of the track pitch TP to the spot diameter D of the laser beam (TP/D) instead of the linear recording velocity or in addition to the linear recording velocity. In such a case, it is possible to select the basic pulse train pattern shown in FIG. 4 when the ratio of the track pitch TP to the spot diameter D of the laser beam (TP/D) is relatively small, to select the single pulse pattern shown in FIG. 5 when the ratio of the track pitch TP to the spot diameter D of a laser beam (TP/D) is relatively large, and to use the basic pulse train pattern and the single pulse pattern in combination when the ratio of the track pitch TP to the spot diameter D of a laser beam (TP/D) is neither small nor large. In the case where the basic pulse train pattern and the single pulse pattern are used in combination, it is possible to determine the pulse train pattern so that the number of pulses whose level is set to a level corresponding to the recording power Pw becomes large as the ratio of the track pitch TP to the spot diameter D of a laser beam (TP/D) becomes smaller and determine the pulse train pattern so that the number of pulses whose level is set to a level corresponding to the recording power Pw becomes smaller as the ratio of the track pitch TP to the spot diameter D of a laser beam (TP/D) becomes larger.

According to the present invention, it is possible to provide a method for recording data in an optical recording medium which can record data in a write-once type optical recording medium at a high linear recording velocity using a laser beam having a low recording power.

Further, according to the present invention, it is possible to provide a method for recording data in an optical recording medium which can record data in a write-once type optical recording medium at a high linear recording velocity using an inexpensive semiconductor laser having a low output.

Furthermore, according to the present invention, it is possible to provide a method for recording data in an optical recording medium which can record data in a write-once type optical recording medium including two or more recording layers at a high linear recording velocity using a laser beam having a low recording power.

Moreover, according to the present invention, it is possible to provide an apparatus for recording data in an optical recording medium which can record data in a write-once type optical recording medium at a high linear recording velocity using a laser beam having a low recording power.

Further, according to the present invention, it is possible to provide an apparatus for recording data in an optical recording medium which can record data in a write-once type optical recording medium at a high linear recording velocity using an inexpensive semiconductor laser having a low output.

Furthermore, according to the present invention, it is possible to provide an apparatus for recording data in an optical recording medium which can record data in a write-once type optical recording medium including two or more recording layers at a high linear recording velocity using a laser beam having a low recording power.

Moreover, according to the present invention, it is possible to provide an optical recording medium in which data can be recorded at a high linear recording velocity using a laser beam having a low recording power.

Further, according to the present invention, it is possible to provide an optical recording medium in which data can be recorded at a high linear recording velocity using an inexpensive semiconductor laser having a low output.

Furthermore, according to the present invention, it is possible to provide an optical recording medium including two or more recording layers in which data can be recorded at a high linear recording velocity using a laser beam having a low recording power.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for recording data in an optical recording medium wherein data are recorded in a write-once type optical recording medium including at least one recording layer disposed on a substrate by projecting a laser beam whose power is modulated in accordance with a pulse train pattern including at least pulses whose levels are set to levels corresponding to a recording power and a bottom power onto the at least one recording layer and forming a recording mark in a predetermined region of the at least one recording layer, the method for recording data in an optical recording medium comprising:

employing a pulse train pattern having a smaller number of pulses whose level is set to a level corresponding to a recording power as a linear recording velocity becomes higher and modulating the power of the laser beam thereby to form a recording mark in the predetermined region of the at least one recording layer, wherein the number of pulses is set to one (1) in the case where data are to be recorded at a high linear recording velocity equal to or higher than a first linear recording velocity, wherein in the case where data are to be recorded at an intermediate linear recording velocity lower than the first linear recording velocity and higher than a second linear recording velocity, the number of pulses is set to one (1) at least when a shortest recording mark is to be formed and the number of pulses is set larger as a length of a recording mark to be formed becomes longer, and wherein in the case where data are to be recorded at a low linear recording velocity equal to or lower than the second linear recording velocity, the number of pulses is set such that a difference between the number of pulses and a number corresponding to a length of each recording mark is constant, and such that, for at least one length of a recording mark, the number of pulses set at the low linear recording velocity is greater than the number of pulses set at the intermediate linear recording velocity.

2. The method of claim 1, wherein in the case where data are to be recorded at the intermediate linear recording velocity, the number of pulses is set to one (1) at least when the shortest recording mark is to be formed, and the number of pulses is set larger as the linear recording velocity becomes lower.

3. The method of claim 1, wherein the first linear recording velocity is equal to or higher than 10 m/sec.

4. The method of claim 1, wherein the bottom power is set to a higher level as the linear recording velocity becomes higher.

5. The method of claim 1, wherein a ratio of the bottom power to the recording power is set higher as the linear recording velocity becomes higher.

6. The method of claim 1, wherein data are recorded in the optical recording medium by projecting the laser beam having a wavelength equal to or shorter than 450 nm thereonto.

7. The method of claim 1, wherein data are recorded in the optical recording medium by employing an objective lens and the laser beam whose numerical aperture NA and wavelength $\lambda$ satisfy $\lambda/NA \leq 640$ nm, and projecting the laser beam onto the optical recording medium via the objective lens.

8. The method of claim 1, wherein the optical recording medium further comprises a light transmission layer, and a first recording layer and a second recording layer formed between the substrate and the light transmission layer, and is constituted so that at least two recording marks are formed by projecting the laser beam thereonto, thereby mixing an element contained in the first recording layer as a primary component and an element contained in the second recording layer as a primary component.

9. A method for recording data in an optical recording medium wherein data are recorded in a write-once type optical recording medium including at least one recording layer disposed on a substrate by projecting a laser beam whose power is modulated in accordance with a pulse train pattern including at least pulses whose levels are set to levels corresponding to a recording power and a bottom power onto the at least one recording layer and forming a recording mark in a predetermined region of the at least one recording layer, the method for recording data in an optical recording medium comprising:

employing a pulse train pattern having a larger number of pulses whose level is set to a level corresponding to the recording power as a ratio of a track pitch TP of the optical recording medium to a diameter of a spot of the laser beam becomes smaller; and modulating the power of the laser beam thereby to form a recording mark in the predetermined region of the at least one recording layer.

10. An apparatus for recording data in an optical recording medium wherein data are recorded in a write-once type optical recording medium including at least one recording layer disposed on a substrate by projecting a laser beam whose power is modulated in accordance with a pulse train pattern including at least pulses whose levels are set to levels corresponding to a recording power and a bottom power onto the at least one recording layer and forming a recording mark in a predetermined region of the at least one recording layer, the apparatus for recording data in an optical recording medium being constituted so as to employ a pulse train pattern having a smaller number of pulses whose level is set to a level corresponding to a recording power as a linear recording velocity becomes higher and modulate the power of a laser beam thereby to form a recording mark in the predetermined region of the at least one recording layer, wherein a ratio of the bottom power to the recording power is set higher as the linear recording velocity becomes higher, wherein the number of pulses is set to one (1) in the case where data are to be recorded at a high linear recording velocity equal to or higher than a first linear recording velocity, wherein in the case where data are to be recorded at an intermediate linear recording velocity lower than the first linear recording velocity and higher than a second linear recording velocity, the number of pulses is set to one (1) at least when a shortest recording mark is to be formed and the number of pulses is set larger as a length of a recording mark to be formed becomes longer, and wherein in the case where data are to be recorded at a low linear recording velocity equal to or lower than the second linear recording velocity, the number of pulses is set such that a difference between the number of pulses and a number corresponding to a length of each recording mark is constant, and such that, for at least one length of a recording mark, the number of pulses set at the low linear recording velocity is greater than the number of pulses set at the intermediate linear recording velocity.

11. The apparatus of claim 10, wherein in the case where data are to be recorded at the intermediate linear recording velocity, the number of pulses is set to one (1) at least when the shortest recording mark is to be formed and the number of pulses is set larger as the linear recording velocity becomes lower.

12. The apparatus of claim 10, wherein the first linear recording velocity is equal to or higher than 10 m/sec.

13. A write-once type optical recording medium comprising a substrate and at least one recording layer disposed on the substrate and being constituted so that data are recorded by projecting a laser beam whose power is modulated in accordance with a pulse train pattern including at least pulses whose levels are set to levels corresponding to a recording power and a bottom power onto the at least one recording layer and forming a recording mark in the at least one recording layer, the optical recording medium being recorded with data for:

setting recording conditions necessary for employing a pulse train pattern having a smaller number of pulses whose level is set to a level corresponding to the recording power as a linear recording velocity becomes higher;

setting the number of pulses to one (1) in the case where data are to be recorded at a high linear recording velocity equal to or higher than a first linear recording velocity;

in the case where data are to be recorded at an intermediate linear recording velocity lower than the first linear recording velocity and higher than a second linear recording velocity, setting the number of pulses to one (1) at least when a shortest recording mark is to be formed, and setting the number of pulses larger as a length of a recording mark to be formed becomes longer; and in the case where data are to be recorded at a low linear recording velocity equal to or lower than the second linear recording velocity, setting the number of pulses such that a difference between the number of pulses and a number corresponding to a length of each recording mark is constant and such that, for at least one length of a recording mark, the number of pulses set at the low linear recording velocity is greater than the number of pulses set at the intermediate linear recording velocity, thereby modulating the power of a laser beam.

14. The write-once type optical recording medium of claim 13, which further comprises a light transmission layer, and a first recording layer and a second recording layer formed between the substrate and the light transmission layer, and which is constituted so that at least two recording marks are formed by projecting the laser beam thereonto, thereby mixing an element contained in the first recording layer as a primary component and an element contained in the second recording layer as a primary component.

15. The write-once type optical recording medium of claim 14, wherein the second recording layer is formed so as to be in contact with the first recording layer.

16. The write-once type optical recording medium of claim 14, wherein the light transmission layer is formed so as to have a thickness of 10 nm to 300 nm.

* * * * *